United States Patent [19]

Pitroda et al.

[11] 4,149,038

[45] Apr. 10, 1979

[54] METHOD AND APPARATUS FOR FAULT DETECTION IN PCM MULIPLEXED SYSTEM

[75] Inventors: Satyan G. Pitroda, Villa Park; Byung C. Min, Bolingbrook; Tej N. Chaddha, Clarendon Hills, all of Ill.

[73] Assignee: Wescom Switching, Inc., Downers Grove, Ill.

[21] Appl. No.: 906,244

[22] Filed: May 15, 1978

[51] Int. Cl.² .............................................. H04J 3/14
[52] U.S. Cl. ............................................... 179/15 BF
[58] Field of Search .................... 179/15 BF, 175.2 R; 340/146.1 R

[56] References Cited

U.S. PATENT DOCUMENTS 3,686,441  8/1972  Thomas .......................... 179/15 BF

FOREIGN PATENT DOCUMENTS 1444919  8/1976  United Kingdom ................ 179/15 BF

*Primary Examiner*—Kathleen H. Claffy
*Assistant Examiner*—E. S. Kemeny

*Attorney, Agent, or Firm*—Leydig, Voit, Osann, Mayer & Holt, Ltd.

[57] ABSTRACT

An idle channel test is provided for a digital time division multiplex and time switching network telecommunications system to detect and diagnose faults in an information path which routes digital information in dedicated channel time slots to and from a "time" switching network. In order to detect and diagnose faults in the information path which includes multiplex/demultiplex circuitry, an idle channel is selected as a test channel at the input to the multiplexer which in turn is the input to the switching network, a test pattern including a bit pattern and a parity bit is inserted into the test channel, the test pattern is connected via the switching network back to one of the demultiplexers and the bit pattern and parity bit are monitored for errors. The idle channel test also allows for the deliberate insertion of a bit pattern error or a parity bit error so the loop from multiplexer, through the switching network and back to any one of a plurality of predetermined demultiplexers can be marked by the propogation of the inserted bit pattern or parity bit error for isolating a fault in the loop.

49 Claims, 7 Drawing Figures

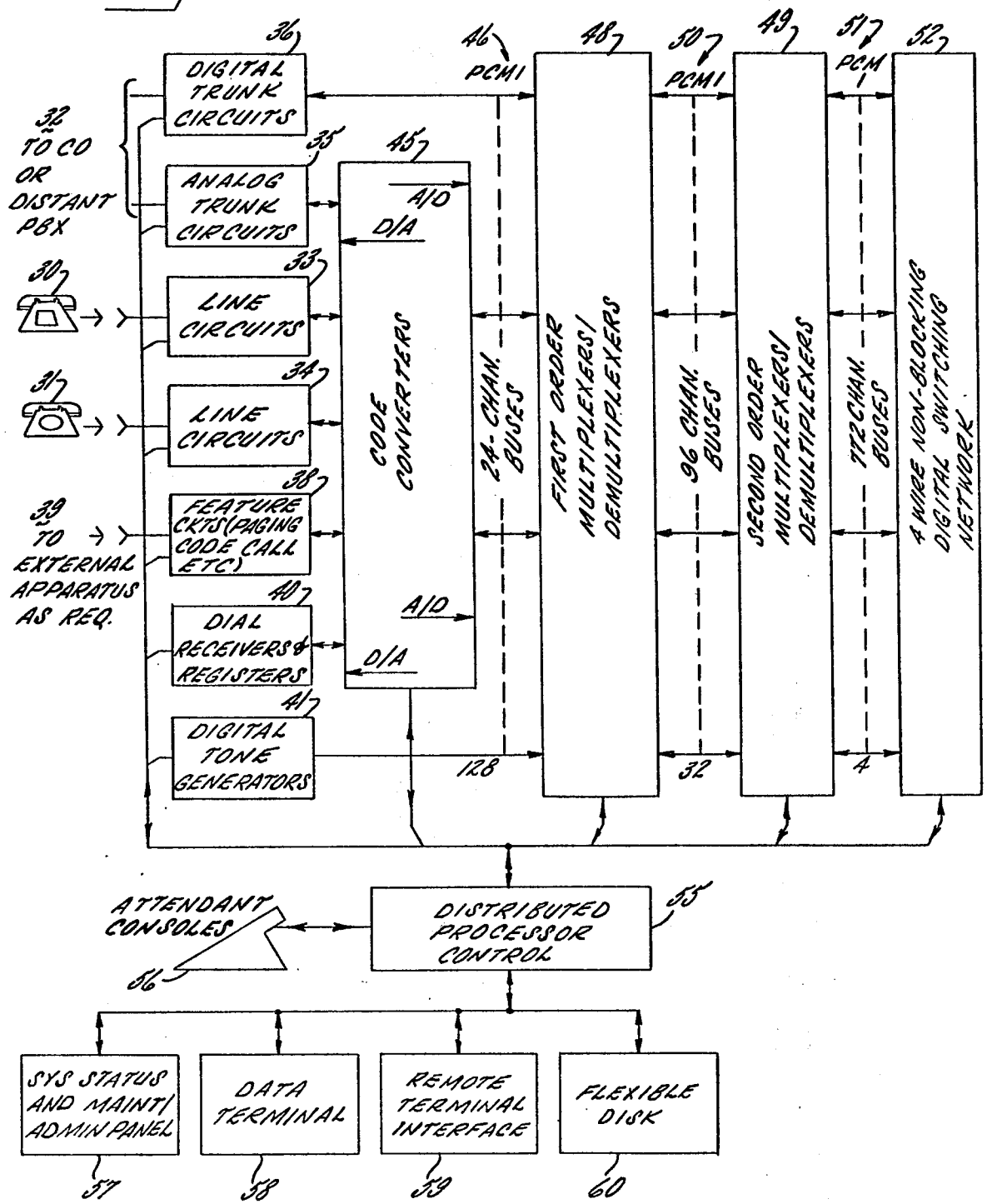

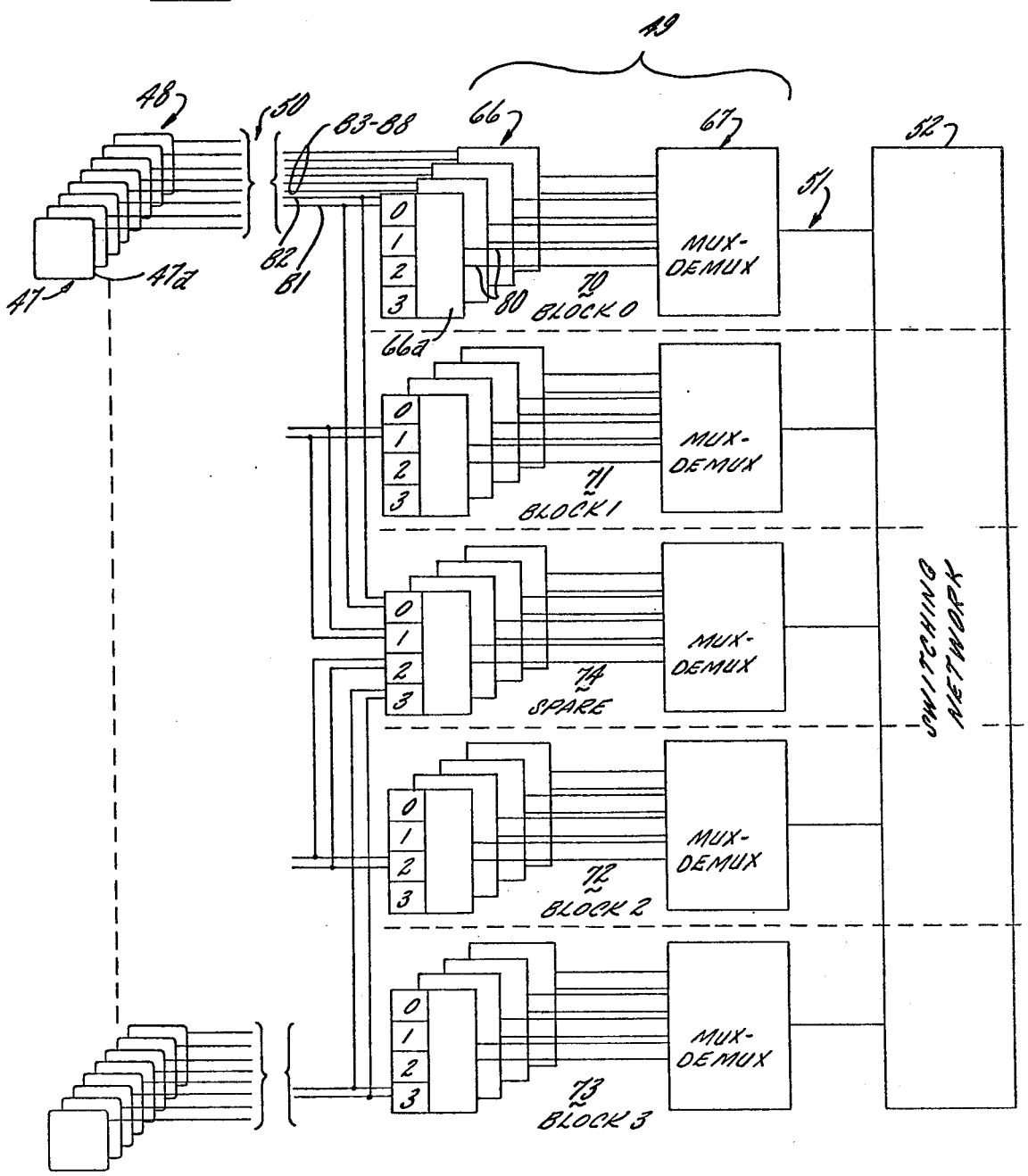

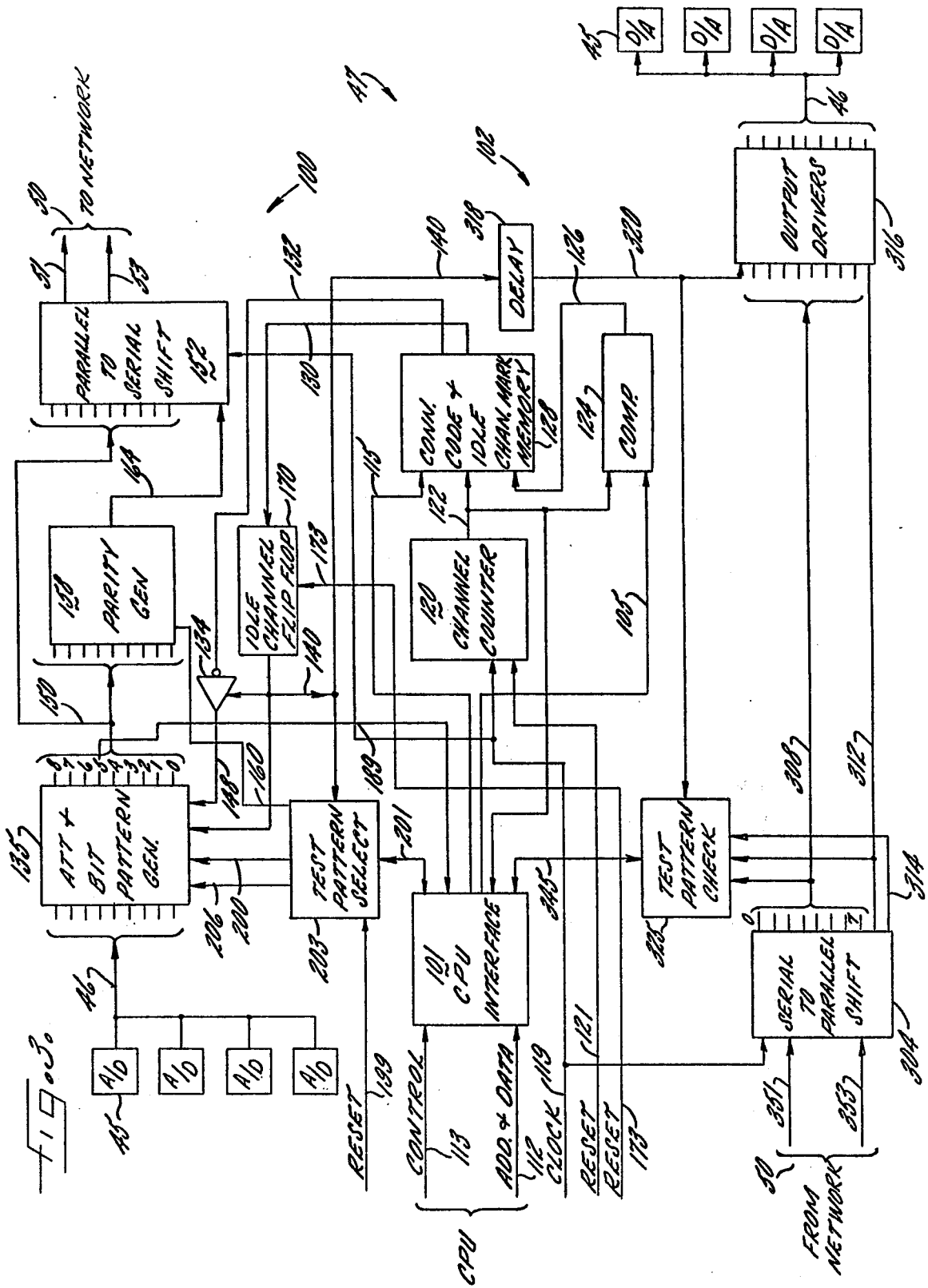

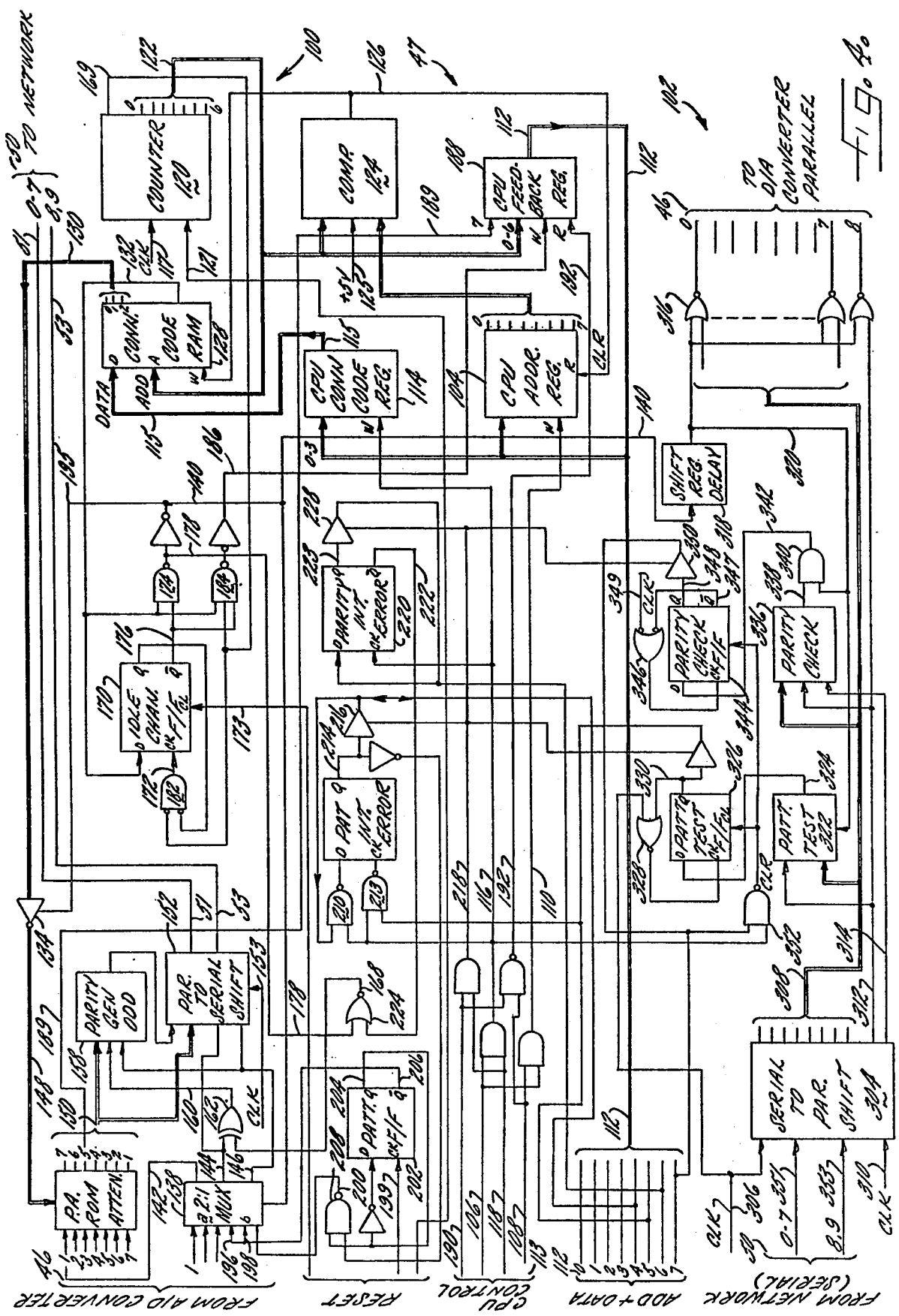

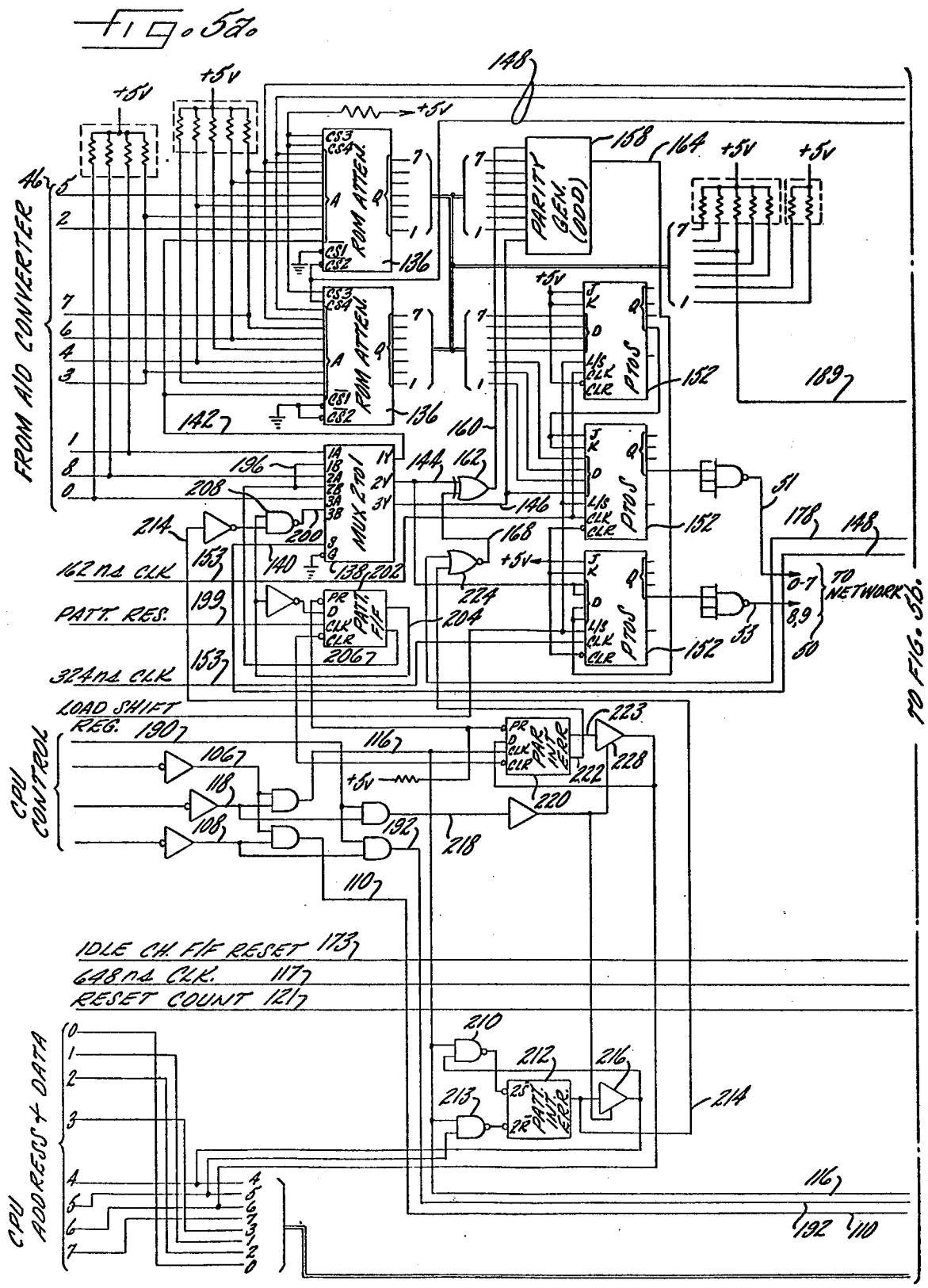

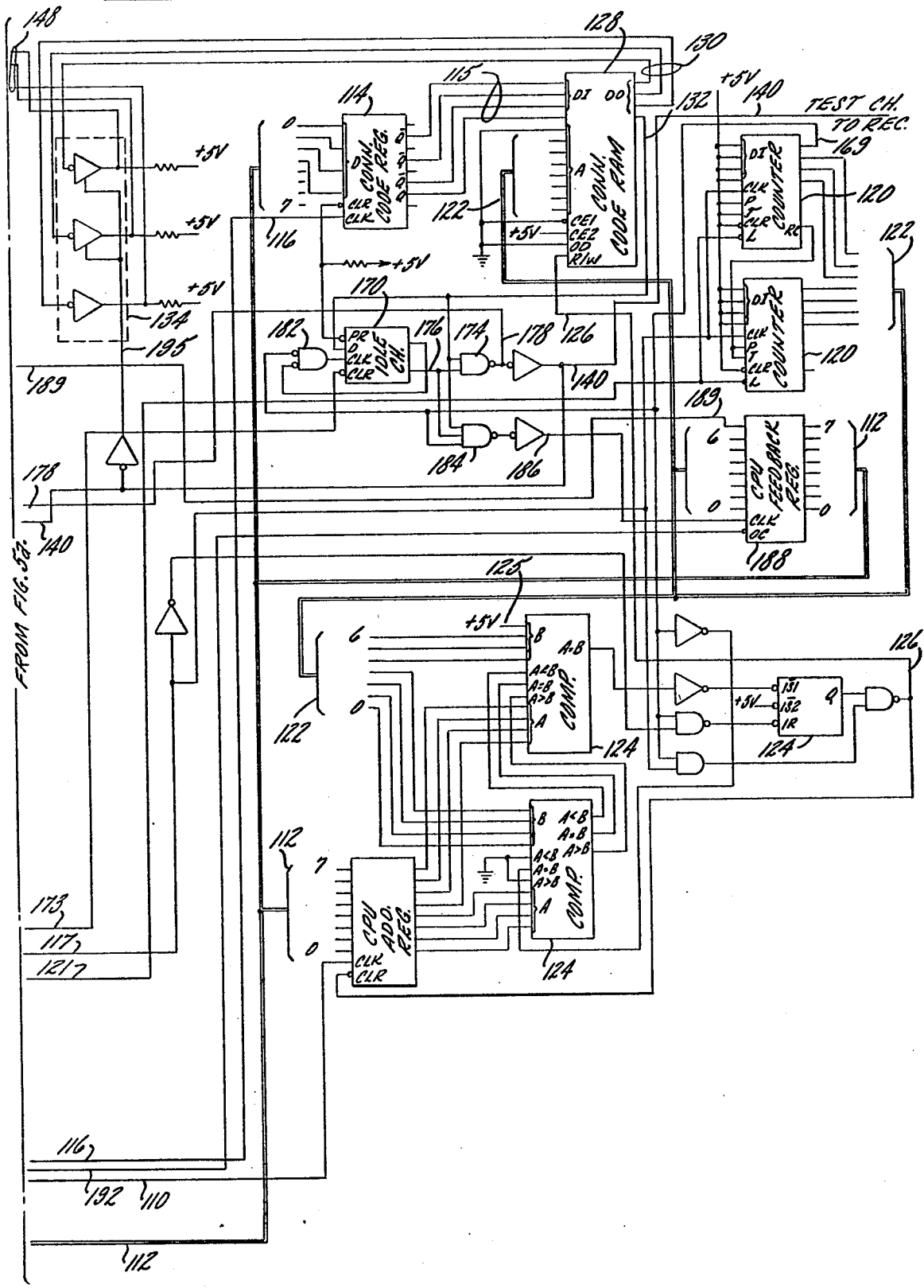

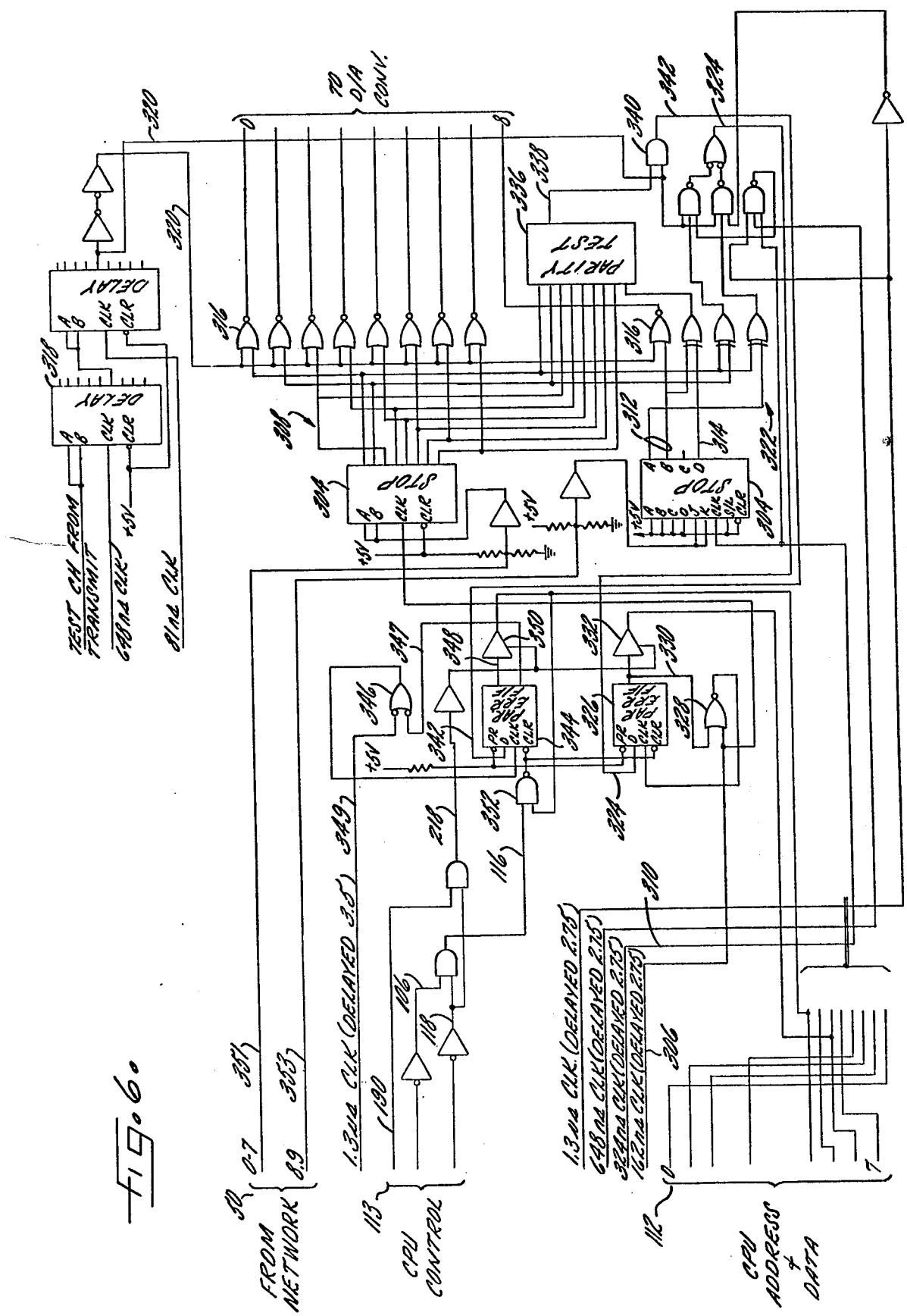

METHOD AND APPARATUS FOR FAULT DETECTION IN PCM MULIPLEXED SYSTEM

BACKGROUND OF THE INVENTION

This invention relates to a digital time division, multiplex telecommunications switching system, and more particularly to methods and apparatus providing real time, fault detection and diagnosis of malfunctions.

In general, call processing by a telecommunications switching system is accomplished by connecting a terminal, for transmitting and receiving information, to another terminal by means of a switching network. In a digital time division multiplex telecommunications switching system, the switching network, which includes an information memory or memories, connects one terminal to another terminal "in time" by sequentially storing digital samples of information from first and second terminals in assigned locations of the information memory, swapping the two samples in time, and returning the first and second samples respectively to the second and first terminals.

In providing "in time" call processing between analog information terminals, the information from the terminals must first be sampled (to create successive pulse amplitude modulated, PAM, signals), after which each sample is digitally encoded by analog to digital converters. The successive digital samples (multi-bit binary words which represent data viewable as numbers) from each terminal correspond to a particular channel in the switching system. After sampling and encoding, the digital samples from various terminals are time multiplexed by multiplexers in order to put several channels of information onto a single transmission path or wire with each channel occupying a dedicated time slot and each bit of a sample represented by time-serial "1" or "0" pulses. Whenever a channel is idle, its time slot on the wire will simply be vacant. Time multiplexing of a number of channels serves to minimize the number of physical wires going to the information memories in the switching network. After the swapping has occurred in memory, the information is routed in reverse sequence back through demultiplexers, to digital-to-analog converters and to the connected terminal.

The swapping of samples in the information memories is accomplished under computer control. The computer or control complex (abbreviated as "CPU") also keeps a record of the status of the switching system including the state of the terminals so as to properly process a request for service. In a system using the present invention, the computer may be distributed microprocessors (as described in Pitroda et al United States application Ser. No. 842,091, filed Oct. 17, 1977, which is a continuation-in-part of Ser. No. 734,732, filed Oct. 21, 1976) which control call processing and monitor the status of the system.

In a digital time division, multiplex switching system of a practical size, having as many as three thousand channels, the number and the complexity of the information routing paths to and from the switching network, and the "time" paths within the switching network, produce a complicated maintenance and diagnostic problem. If, for example, there is a failure in the switching network, the wrong channel samples may be swapped. Any such failure appears to be a fault in the system information path including the multiplexers/demultiplexers. The maintenance and diagnostic problem becomes how to detect error in the information path in real time and then to isolate those errors to a minimum number of circuit components in the multiplexers/demultiplexers and the switching network.

Furthermore, telephone switching equipment must have an extremely high degree of reliability. Commonly, only one hour of system down time in twenty years is the reliability goal. It is important, therefore, to detect and identify faults as soon as they occur, so that they may be cured expeditiously or back-up equipment placed into service. Maintenance of the switching system hinges on providing fault detection which is able to rapidly detect real, as opposed to apparent, faulty operation of the system components so that proper remedial action can be taken, i.e., switching in spare circuits or providing fault information so that a craftsperson can replace the faulty components.

SUMMARY OF THE INVENTION

It is the general aim of the present invention to detect fault conditions in the switching system's information path including the multiplex/demultiplex circuitry and the switching network during real time operation of the switching system by apparatus and methods which function more or less continuously and automatically.

It is also an object of the present invention to continuously monitor for and detect fault conditions in the switching system's information path including the multiplex/demultiplex circuitry and the switching network during real time by advantageous use of an idle channel as a test channel in the switching system so as not to constrain the system's ability to process calls. In that regard the use of the test channel should provide no interference with normal call processing and in fact be "invisible" to normal call processing even though the test channel uses the same circuitry as the normal call processing.

It is also an object of the present invention to detect fault conditions in the switching system's information path including the multiplex/demultiplex circuitry and the switching network by automatic testing in an idle channel to provide diagnostic information to the system's computer so that the computer can take the appropriate action—switching in spare components or printing out the fault for a craftsperson to utilize.

It is also an object of the present invention to detect fault conditions in the switching system's information path including the multiplex/demultiplex circuitry and the switching network by test signaling in an idle channel in a fashion to isolate system faults down to a minimum number of components.

It is also an object of the present invention to provide fault detection circuitry as part of the multiplex/demultiplex circuitry of the switching system that will, by test signaling in an idle test channel, test a majority of the hardware in an information path between the multiplexer/demultiplexer and the network information memories.

It is also an object of the present invention to provide fault detection apparatus as part of multiplex/demultiplex circuitry which will reveal and separately identify (i) improper processing of data (e.g., sound) signals and (ii) malfunctioning of parity injection and monitoring operations.

In the latter vein, it is an object of the present invention to provide fault detection circuitry as part of multiplex/demultiplex circuitry which will generate an intentional bit pattern error and an intentional parity bit error which can be injected into the idle test channel to mark uniquely an information path being tested in the network.

Other objects and advantages of the present invention will become apparent upon reading the following detailed description and with reference to the drawings, in which:

BRIEF DESCRIPTION OF THE DRAWINGS

FIG. 1 is an overall block diagram of a digital time division, multiplex switching system in which a preferred form of the invention is embodied;

FIG. 2 is a block diagram showing the interconnection between the multiplex/demultiplex circuitry and the network's information memories which interconnection can be conveniently tested by means of the present invention;

FIG. 3 is a simplified block diagram of the multiplexer/demultiplexer circuitry which includes fault detection circuitry illustrative of the present invention;

FIG. 4 is a more detailed block diagram of the multiplex/demultiplex circuitry which includes fault detection circuitry illustrative of the present invention;

FIGS. 5a and 5b are schematic diagrams of the multiplex circuitry which includes fault detection circuitry illustrative of the present invention; and FIG. 6 is a schematic diagram of the demultiplex circuitry which includes fault detection circuitry illustrative of the present invention.

DETAILED DESCRIPTION OF THE PREFERRED EMBODIMENT

While the invention will be described in connection with certain embodiments presently considered to be preferred, there is no intent to limit it to those embodiments. On the contrary, the intent is to cover all alternatives, modifications and equivalents included within the spirit and scope of the invention as defined by the appended claims.

Referring now to FIG. 1, there is shown an overall block diagram of a telecommunications switching system intended to serve as an illustrative environment for the idle channel fault detection method and apparatus of the present invention. The switching system is adapted to serve a plurality of lines represented by telephone instruments 30, 31 and also to a plurality of trunks generally indicated at 32. The general term access ports will be used herein to denote these and other system input terminals. Circuitry is provided to interface the lines and trunks to the switching system, such circuitry being represented by line circuits 33, 34, analog trunk circuits 35 and digital trunk circuits 36. Because the switching system is of the four wire variety, the line circuits 33, 34 and the analog trunk circuits 35 include hybrids for converting the two wire line signals to four wire for use by the switching system. The digital trunk circuits 36 are not necessary in the practice of the invention, but are shown for sake of completeness. Such circuits are intended to directly interface a T1 digital line to the switching system without the need for code conversion of any sort.

In addition to establishing and maintaining "standard call" connections between lines and trunks, the system is capable of providing additional features where desired. The apparatus for effecting such features is represented at element 38. For example, the system may be configured to carry out, as optional functions, paging, code call, multi-port conferences and the like. Additional apparatus as required, for example audio equipment for use with the paging feature, is indicated generally at 39.

Means are provided for receiving and storing dialed digits for use by the control complex in establishing connections between the lines and trunks as required. Such equipment, generally indicated at 40, may include both dial pulse receivers and dual tone multi-frequency ("DTMF") receivers, the general term dial receivers being used to encompass both. In addition, the equipment includes registers for storing the digits as they are received.

In order to inform a user of the response of the system to his request, progress tones are required, such tones in the instant embodiment being produced by digital tone generators 41. The tones produced by such generators include dial tone, ring back, busy tone and the like. While analog tone generators may be utilized, the digital tone generators 41 of the instant embodiment eliminate the need for code conversion, and are therefore directly compatible with the switching system.

As noted above, the switching system is configured as a four wire digital system, and therefore requires bi-directional conversion between the analog information on the trunks and lines to a digital format. To that end, a plurality of code converters are provided indicated generally at 45. In the preferred embodiment the digital code utilized is compatible with North American Industry standards, utilizing an eight-bit format, a 1.544 magabit transmission rate and compression with $\mu$ equal to 255. As a result the code converter block 45 may be comprised of a plurality of rather conventional T1 PCM code converters, each capable of handling 24 channels, and each providing analog-to-digital conversion in the direction toward the network and digital-to-analog conversion in the direction toward the lines and trunks. A practical embodiment of the illustrated switching system can handle a maximum capacity of 3088 channels, 3072 active channels and 16 lost to framing. Such a system would require approximately 128 code converters, each capable of handling twenty-four channels, thereby providing at the output of the code converters 45 a plurality of PCM buses 46, each carrying bi-directional information for twenty-four channels. In the 3088 channel system, there are 32 of such buses resulting from tying four code converters to each bus. Each bus is in turn implemented as a pair of oppositely directed unidirectional, nine-wire cables to carry time-sequenced words, each word having eight plus a ninth signaling bit.

In order to properly route the coded signal samples from the lines to the network for efficient switching, and from the network to the lines for distribution, a pair of multiplexers are provided, indicated as first order or low level multiplexer/demultiplexer 48 and second order or high level multiplexer/demultiplexer 49. Each low level multiplex section of multiplexer/demultiplexer 48 receives 96 channels of time sequenced parallel bit information from four 24-channel code converters on 32 buses 46 and multiplexes the parallel bit format information into fully time-serial information for 96 channels. The low level multiplexer/demultiplexer 48 demultiplexes the signals flowing in the opposite directions. The high level multiplexer section of multiplexer/demultiplexer 49 receives the time-serial information on the 32 incoming buses 50, converts it to ten-bit parallel form (eight bits of data, a signaling bit and a parity bit) and arranges it on four parallel ten-wire buses 51 each carrying information for 772 time sequenced channels. The high level demultiplexer performs the complementary function in the opposite direction on a second ten-wire bus 51. The four 772 channel buses are provided to the four wire non-blocking digital switching network 52 which serves to switch in time information from selected channels for the purpose of completing connections between those channels.

The configuration of the digital switching network itself is known, being explained, for example, in "A Review of Telecommunications Switching Concepts - Part 1" and Part 2 thereof, published in *Telecommunications* February 1976 and March 1976, respectively. Suffice it to say that the network, or each block thereof includes an information memory having individually addressable locations (each 10 bits wide) for each channel in the system. Information received and processed through the code converters is multiplexed onto the appropriate buses where each channel occupies a dedicated time slot. This information is sequentially written into dedicated network information memory locations, with all samples being updated each 125 microseconds. For the purpose of making connections, the network, or each block thereof includes one or preferably two connection memories, each having an addressable location dedicated to each channel in the system. A connection is established by writing "paired numbers" into a "connection memory". The address of a first terminal is written at the location assigned to a second terminal, and vice-versa to "connect" the first and second terminals. Thereafter, during the time slot or network channel time for the first terminal, the information memory is written with the data from the terminal, and also data is read out of the information memory from the address established by the connection memory for the second terminal, thereby placing the data sample from the second terminal into the time slot for the first terminal for return to the first terminal. Subsequently, during the occurrence of the time slot for the second terminal, a similar operation takes place with the result being that data samples from the two terminals are swapped in time causing the first terminal to receive samples from the second terminal and vice versa. In short, a communication path "connection" is established.

In order to accommodate efficiently the 3072 channels, the network is preferably broken into four physical blocks. Each blocks writes information into only one-fourth of the total number of channels, that is, 772 channels. However, to provide full availability, returning information from each channel is written into each of the four blocks.

The interaction between the elements of the system described thus far is under the control of the distributed processor control complex 55. Stated generally, the control complex detects requests for service from lines, trunks and the like, determines available class of service for those elements and completes connections in the network. To that end the distributed processor control complex 55 has circuit connections to the line circuits 33, 34, and specifically to sense points thereof for detecting the on-hook or off-hook condition of the lines and changes between such conditions. Circuit connections are also provided to control points on the line circuits and can be used, for example, to initiate or terminate ringing to selected lines, to set attenuators in the transmission path or the like. The complex 55 also has circuit connections to the trunks, and specifically to the sense points for detecting the conditions thereof and to control points for controlling the trunks. Similar connections are provided to the feature circuits 38. Circuit connections between the control complex and the dial receivers and registers 40 are used to cause those receivers to collect dialed digits and to receive the collected digits for the purpose of completing connections. The complex 55 also has circuit connections to the digital tone generators 41, the code converters 45 and the multiplexers/demultiplexers 48 and 49 for exercising appropriate control over those elements. Connections are also provided between the complex 55 and the network 52 for allowing the complex to write addresses into the connection memories for the purpose of establishing connections between the access ports.

The control complex also initiates and monitors the idle channel test. In that regard, the complex marks the idle channels which are available as a test channel, instructs the fault detection circuitry what test pattern to use (with or without a bit pattern or parity error), sets up the switching network connection for the idle channel and keeps track of any error in the test pattern upon receipt from the switching network.

Additionally, the system makes provision for attendant consoles 56 which typically include an array of indicators or readouts for informing an attendant of system conditions, combined with an array of pushbuttons for allowing the attendant to cause the system to perform specific functions.

Finally, for the sake of completeness, additional elements are shown connected to the distributed processor complex 55, including a system status and maintenance administration panel 57, generally located in the equipment frame for informing a craftsperson of the operational status of the equipment. A data terminal 58 provides a port for entry of information into the system, such as for changing number assignments, and for readout of information from the system, for example, traffic information or the like. A remote terminal interface 59 allows the control complex 55 to be accessed from a remote location for the purpose of trouble-shooting or updating of the program. Finally, a flexible disc playback unit 60 containing the operating program for the system is actuated to load initially the program and may be automatically actuated to reload the program in the event of a major system failure.

In summary, each line circuit (the illustrative 3088 channel system here to be treated provides up to 2400), each trunk circuit (the system provides up to 576) and each register (the system provides for 64) occupies a dedicated channel on one of the code converters within converter module 45. Those channels are multiplexed through multiplexers/demultiplexers 48 and 49 such that ultimately each line, trunk, register or tone occupies a dedicated time slot on one of the 772 channel network buses. During a simplified call processing routine, the control complex 55 detects a subscriber off hook condition while scanning the array of line circuit sense points. Upon detection of the off hook, the processor ultimately establishes network-through-connections by writing corresponding addresses into the connection memories in the network. The PCM encoded samples received from the lines, trunks or the like are exchanged between called and calling subscribers every 125 microsections. After the network-through-connection is established by the processor, the network information memories accept the PCM encoded samples from subscriber A during subscriber A's dedicated time slot and output subscriber B's previously stored sample. The subscriber A sample is stored until the occurrence of the subscriber B time slot whereupon it is read out while a new sample is stored for subscriber B. This swapping operation continues independently of the control complex 55 until a call termination or other action is sensed whereupon the connection may be cancelled or altered via a further writing of addresses into the network connection memories.

Turning now to FIG. 2 there is shown the general architecture and interconnection of the low level multiplexer/demultiplexer 48, the high level multiplexer/demultiplexer 49 and the network 52 with its information memories.

The low level multiplexer/demultiplexer 48 comprises 32 circuit cards 47. Each circuit card 47 carries digital information in both directions between the 24 channel bus structure 46 and the 96 channel bus structure 50. In carrying information from the code converters 45 to the high level multiplexer/demultiplexer 49, each circuit card 47 receives 96 channels of parallel bit information from four 24-channel code converters on a nine-wire cable which forms half of the bus structure 46. Each channel consists of nine parallel bits, one bit on each wire. The nine bits are divided into an eight bit data word with a ninth signaling bit. Multiplexer circuitry on each circuit card 47 then multiplexes the information into 96 channels of serial information and feeds the 96 channels of serial information to one of the 32 buses of bus structure 50. Each of the 32 buses of bus structure 50 consists of two wires going toward the high level multiplexer. There are also two wires coming from the high level multiplexer. One wire of the two wires going toward the high level multiplexer carries 96 channels of eight serial data bits, each channel occupying a dedicated time slot 1.296 microseconds wide. Therefore each of the eight serial data bits occupies one bit time slot 162 nanosecond wide. The second wire of the two wires carries 96 channels of the signaling bit and a parity bit (which is generated at the low level multiplexer) in serial fashion with each bit alloted a 648 nanosecond time on the second wire. The 96 channels are composed into a frame 125 microseconds wide with each channel having a unique dedicated time slot so that each channel on each card can be represented by a channel count from 0-95.

In the reverse direction, each circuit card 47 of the low level demultiplexer receives 96 channels of serial information from the high level demultiplexer on one of the 32 buses of bus structure 50. Each of the 32 buses of bus structure 50 consists of two wires coming from the high level demultiplexer. The eight data bits for 96 channels are on one wire and the signaling and parity bit are on the other. The demultiplexer circuitry on each circuit card 47 converts that serial information to 96 channels of parallel bit information and distributes it on a nine-wire cable, eight data bits and one signaling bit (the parity bit is checked at low level demultiplexers), leading to the inputs of four time-shared 24-channel D-to-A converters.

The two separate wires for each of the 32 buses of bus structure 50 (one wire for eight data bits and one wire for the parity and signaling bits) are provided so that a paralel path for the parity bit is provided. If the parity bit were sent in time sequence on a serial bus with the eight data bits, any fault in that serial bus would effect both the data and parity bits, and the parity check would be useless. In the present scheme the parity bit can be transmitted to and from the switching network accurately even if its associated data bus has completely failed.

The high level multiplexer/demultiplexer 49 comprises serial-to-parallel-to-serial converter indicated generally at 66 as well as multiplexers/demultiplexers 67. The high level multiplexer/demultiplexer 49 and the network 52 are divided into four primary blocks 70 through 73, and a spare block 74. The 32 buses (each carrying 96 channels of serial information) of bus structure 50 carry information between the low level multiplexer/demultiplexer 48 and the high level multiplexer/demultiplexer 49.

In the illustrated embodiment serial-to-parallel-to-serial converter 66 serves as the high level multiplexer's/demultiplexer's interface for servicing the bus structure 50. The converters 66 feed respective multiplexers/demultiplexers 67 which further converge the digital information toward the switching elements, the information memories, within network 52 which operate under the control of the connection memory as "all time" switches.

In the illustrated embodiment each of the network blocks is capable of handling 768 channels of information. To efficiently accommodate that capacity, the serial-to-parallel-to-serial converter of each block is configured as four cards, each card capable of handling two of the 96 channel buses. Accordingly, each block handles 8 of the 96 channels buses, providing as an input to the information memory a bus carrying information from 768 channels.

Referring to converter card 66a of block 0, it is seen that the card is segmented into four sections 0-3 at the low level end, the 0 block having 96 channel buses B1, B2 connected thereto, and having a common section at the high level and providing two output buses 80 (each containing nine wires plus one for parity) to the high level multiplexer 67. Each of the remaining cards in block 0 is connected in the same manner to service the 96 channel buses B3-B8. In block 1, the 1 section of the converter card is used, in block 2, the 2 section and in block 3, the 3 section. The spare network block converter cards have all four sections connected to the incoming buses, for example, card 66b serving buses B1, B2, B9, B10, B17, B18, B25 and B26. Configuring the converter cards in this manner allows a single card type to function as any of the primary blocks when inserted in the appropriate location in the card file or as a spare converter when inserted in the spare block file.

The serial-to-parallel-to-serial converters accept the serial information from the associated buses, convert it to parallel, and hold that converted data on their output buses such as 80 for reception by the high level multiplexer 67 at the appropriate time during its scan of the converters. Operating in the opposite direction, the converters 66 accept demultiplexed parallel information (ten bits at a time), convert it to serial and drive the return buses B1-B32 for distribution of the information via the low level multiplexers 48 and D-to-A converters to the access ports. It should be noted that each bus B1-B32 is actually implemented as two unidirectional wires (plus two additional unidirectional wires to carry parity and signaling bits) although for convenience each is illustrated herein as a single bidirectional bus. Multiplexers/demultiplexers 67, as noted above, cyclically accept the parallel information from the converters 66 to provide parallel information to the information memories on 768 channel buses 51. Such information is written into the information memories in dedicated time slots. Under the control of connection memories, the information memories are read out for inserting such information on the return 768 channel buses to multiplexers/demultiplexers 67, where it is demultiplexed, transmitted to the converter cards 66, serialized for transmission back through the low level multiplexer/demultiplexer 48, the D/A section of the code converters for distribution to the line, trunk, or register circuits as needed.

With continued reference to FIG. 2, fault detection is accomplished by an idle channel test which is implemented by fault detection circuitry on each of the 32 circuit cards 47 which comprise the low level multiplexer/demultiplexer 48. In initiating an idle channel test, the fault detection circuitry first locates an idle channel within a frame of 96 dedicated time slots in a manner to be more fully described. This assures that no "connection" between two ports (terminals) is ever interrupted or disturbed; normal calls proceed while diagnostic tests are conducted more or less continuously. After the idle channel has been located, a test pattern consisting of a bit pattern and a parity bit is inserted into that idle channel or dedicated time slot and transmitted to the switching network through low level multiplexer/-demultiplexer 48, the high level multiplexer/demultiplexer 49 and the associated buses. Normally a loop back connection is set up in the switching network by the processor control complex 55 (FIG. 1) so that the test pattern which was generated on card 47a, for example, and injected into an idle channel is connected through the switching network and returned in the same channel to card 47a. The fault detection circuitry on card 47a determines whether or not the test pattern was properly transmitted and returned without fault through the low level multiplexer/demultiplexer 48, the high level multiplexer/demultiplexer 49, the associated buses 50 and 51 and the switching network 52.

Because the 96 channels at the input of each card 47, such as card 47a, of multiplexer/demultiplexer 48 are multiplexed in time division, each channel for card 47a has a dedicated, unique time slot, but all 96 channels being processed by card 47a use the same common multiplex/demultiplex hardware on card 47a. Also all 96 channels processed by card 47a use common hardware of bus B2 of bus structure 50. Likewise the serial-to-parallel-to-serial converter 66a processes the information on bus B2 in a time division manner so that any one of the 96 channels, while having a unique dedicated time slot, still uses common hardware on card 66a. Moreover, the two output buses 80 from card 66a each transmit all 96 channels so that all 96 channels utilize the same hardware on bus 80.

Likewise in the multiplexers/demultiplexers 67, eight of the buses 80 are time sampled and multiplexed so that 772 channels are processed in a time division fashion by common hardware of the multiplexer/demultiplexer 67 and its associated output bus 51. When the digital information reaches the switching network, each channel is assigned a unique memory location having unique hardware for each channel.

As a result, only one channel of 96 channels, processed by each low level multiplex/demultiplex card 47, is required to transmit and receive back a test pattern that will exercise every path and the associated common hardware in the low level multiplexer/demultiplexer 48 and in the high level multiplexer/demultiplexer 49 including the complete digital voice path-the information path.

During normal call processing by the switching system there exists the extremely high probability that at least one of the 96 channels for each of the 32 cards 47 and associated buses B1 through B32 will be idle so that the idle channel can be used for fault detection during real time while other call processing continues for other channels uninterrupted. In short then, it is possible for the switching system to run idle channel fault detection tests as though there were an ordinary call being placed on that idle channel while the other busy and idle channels are being processed in a normal fashion.

In order to appreciate the advantages and flexibility of using an idle channel as a test channel for fault detection and diagnostic testing, the operation of the fault detection circuitry can operate in two recognizable idle channel test modes —normal with self test capability and diagnostic. Normal operation will be defined as operation when the switching system is processing calls in normal fashion, and the fault detection circuitry is searching for a fault to crop up. During such normal operation the idle channel test provides the following operating parameters. First, the bit pattern inserted in the idle channel is intially all "0's" followed 125 microseconds (one frame) later by an all "1's" pattern in the idle channel. Second, the parity bit generated and inserted in the idle channel is for odd parity. Third, the switching network connection set up by the processor control complex 55 for the normal idle channel test is such that the test pattern comprising the bit pattern and the parity bit generated on one circuit card 47a, for example, is looped back to that same card in the same channel for checking and verification of the test pattern.

Periodically during normal operation of the switching network, the fault detection circuitry on command from the CPU will insert a bit pattern intentional error (a "1" in bit 0 of the all "0's" bit pattern —referred to hereinafter as BPIE) and a parity pattern intentional error (changing from odd to even parity —referred to hereinafter as PPIE) as a means of providing a self test for the bit pattern and parity generating and detecting circuits. In that way in the absence of an information path error, the CPU can verify that the fault detecting circuitry itself is working. During normal call processing self testing is done in the loop back mode to save on real time use of the system channels. During low traffic times, the idle channel test including self testing can be run using cross connection in order to completely cover all the hardware in the information path.

Once a persistent error has been detected in either the bit pattern or the parity bit during normal idle channel testing, the software in the processor control complex 55 can initiate the diagnostic idle channel test mode operation of the fault detection circuitry. By setting up a specific, predetermined series of cross-connections between two idle test channels the exact location of faulty hardware in the switching system's information path including multiplexer/demultiplexer sections 48 and 49 and the switching network 52 can be determined.

The flexibility of processor complex control of the idle channel test allows the test to quickly and accurately isolate the defective component in the information path. Having isolated the defective component the processor complex can provide a printout for a craftsperson so that the defective component can be replaced. Furthermore, the information provided to the processor complex 55 by the idle channel test can be used by the processor complex to bypass the defective component.

As stated, the idle channel test is carried out by first identifying an idle channel at the low level multiplexer/demultiplexer circuit card 47, inserting a test pattern (an eight bit word, a signaling bit and a parity bit) in the idle channel, and checking the test pattern received back in the idle channel from the switching network through a network connection set up by the system's control processor complex 55. Except for the switching network connection which is set up by the control processor complex 55 in response to signals returned to it which identify the selected idle channel, the idle channel test is, for the preferred embodiment, implemented by hardware located on each low level multiplexer/demultiplexer circuit card 47. FIG. 3 is a simplified block diagram of one low level multiplexer/demultiplexer card 47(shown with connection via a time-shared nine-wire bus 46 to four analog-to-digital and four digital-to-analog converters 45).

Each low level multiplexer/demultiplexer circuit card 47 comprises a multiplexer or transmit section 100 and a demultiplexer or receive section 102. The transmit section receives 96 channels of parallel bit PCM data (i.e., 9 bits for one channel at one time, there being 96 channel time slots) on bus 46 from four analog-to-digital converters 45. The transmit section digitally attenuates the data in conformity with the type of connection (whether line-to-line or trunk-to-line) and converts the digital PCM data from 96 channels of nine parallel bits to 96 channels of all serial signals (768 total bits per repetition cycle or frame for the eight-bit data and 192 bits per frame for the signaling and parity bit) for transmission on the 96 channel bus 50 to the high level multiplexer/demultiplexer 49 and ultimately to the switching network 52.

The receiver section 102 of each low level multiplexer/demultiplexer card 47 receives 96 channels of all time serial PCM data on bus 50 from the high level multiplexer/demultiplexer 49 and converts the serial PCM data to 96 time serial channels, each having nine parallel bits, for transmission via bus structure 46 to four digital-to-analog converters 45.

In addition to the transmit section 100 and the receive section 102 of the low level multiplexer/demultiplexer circuit card 47, the circuit card 47 also includes CPU interface 101 which controls and monitors the operation of the circuit card 47 when it is running an idle channel test as well as when it is processing ordinary call information.

Turning first to the transmission section 100 of the low level multiplexer/demultiplexer card 47, its construction and operation will be described first with respect to a channel that is not being used as a test channel but is processing an ordinary call.

At some time after the ordinary call was set up in the switching network by the processor control complex (CPU) 55 (FIG. 1), the processor informs the low level multiplexer/demultiplexer card 47 of the address of the connection and the type of connection that was made —line-to-line, line-to-trunk, etc. The address signals represent one of the 96 channels 0-95 which are handled by the card 47, and the connection code signals designate the type of connection which has been set up in the network for that one channel. All of the channels 0-95 are treated in this fashion. The address and connection information is communicated to card 47 by means of CPU interface 101. The CPU first transmits the connection address (channel identification) on address and data bus 112 and provides a control signal on control bus 113 to store that connection address in CPU interface 101. After the connection address is stored in CPU interface, the address is available on output 105 of the CPU interface 101. At some later time, the information on address and data bus 112 is changed to indicate the type of connection, and a control signal on bus 113 causes that information to be stored in the CPU interface 101 and to be made available on output 115.

A circuit card channel address counter 120 is synchronized with the switching system by a reset signal on line 121 that loads an initial count. The counter 120 is then clocked by a clock signal on line 119 to count the channels, 0 to 95, and indicate which channel within a particular frame is being processed by the transmit section 100. Line 119 in FIG. 3 represents a plurality of lines each carrying a clock signal with a distinct period. The channel address count at the output 122 of the counter 120 is fed to comparator 124 where it is compared to the address from the CPU which is available at output 105 of the CPU interface 101.

When the comparator 124 has determined that the channel counter address on line 122 is equal to the CPU address on line 105, a "write" signal is generated on line 126 which causes connection code and idle channel mark memory 128 constituted by a random access memory (RAM) to store the connection information available on line 115 in the connection code memory 128 at the address specified by the channel counter and available on line 122. In the absence of a "write" signal on line 126, the memory 128 "reads out" the contents of its successive memory locations as the counter 120 cycles through its 96 effective count states corresponding to channel times for channels 0–95.

After the connection code has been stored in the memory 128 that information is available subsequently during the same channel time on output line 130. The connection information on output line 130 is fed via gated driver 134 to input 148 of digital attenuator and bit pattern generator 135. The connection information on line 148 conditions the digital attenuator so that the incoming PCM data on bus 46 is digitally attenuated by a predetermined amount depending on the type of connection. In that manner, the proper voice level can be achieved when the data is received back from the switching network and connected to another terminal.

The attenuated outputs 150 of digital attenuator 135 are then fed to a parity generator 158 which generates an odd parity bit on line 164. The PCM data bits on line 150 (including the signaling bit) and the parity bit on line 164 are then connected to parallel-to-serial shift register 152. A clock signal on line 119 drives shift register 152 to multiplex the data and parity bits onto serial bus 50. The serial bus 50 includes two wires 51 and 53. Wire 51 transmits data bits 0 through 7 in a dedicated time slot 1.296 microseconds long, and wire 53 transmits bit 8 (used as a signaling bit) and bit 9 (the parity bit) in a dedicated time slot 1.296 microseconds. The serial information on buses 51 and 53 of bus 50 is then connected to the high level multiplexer/demultiplexer 49 and ultimately to the switching network. Both buses 51 and 53 carry serial information divided into 96 channels, each channel occupying a unique, dedicated time slot.

After one channel has been processed and put onto bus 50 in its unique time slot, the channel counter 120 increments and reads out the connection code memory 128 for the next sequential channel and processes that channel.

Turning now to the operation of the transmit section 100 when an idle channel is encountered, the connection code is provided from the computer via CPU interface 101 and output 115 and contains an idle channel mark. The idle channel mark is stored in connection code memory 128 just as the connection code for a busy channel was stored. When the memory 128 is addressed by counter 120, the idle channel mark is read out onto line 132. The idle channel mark signal on output 132 of memory 128 initiates an idle channel test procedure and then sets the idle channel flip-flop 171.

The idle channel flip-flop 171 is associated with circuitry which serves to place a signal on output line 140 that indicates that an idle channel test is being run (during that channel time) for the channel indicated by counter 120. The idle channel flip-flop is also constructed so that no other idle channels in a particular frame after the first idle channel encountered can be used as a test channel until the idle channel flip-flop is subsequently cleared at the beginning of the next frame by a reset pulse on line 173. In that way the lowest numbered idle channel, i.e., the "first found", is always selected and used as the test channel.

The test channel signal on line 140 operates to disable driver 134 and prevent connection code information on line 130 from reaching the digital attenuator 135 and forces the signal on line 148 to be "0" indicating to the digital attenuator 135 that a test pattern is to be run. The test channel signal on line 140 also activates a test pattern select device 203 which selects one of two possible test patterns for insertion into the test channel. The test pattern select device 203, during normal test operation, provides output signals on lines 200 and 206 which cause the digital attenuator and bit pattern generator to generate on all 0's bit pattern (in bits 0–8) at outputs 150 for insertion into the idle channel during one frame followed by an all "1's" bit pattern (in bits 0–8) at outputs 150 for insertion into the idle channel during the subsequent frame and so on. Line 189, which is one bit (for example, bit 5) of outputs 150 of digital attenuator 135, is connected to CPU interface 101 so that the CPU can monitor a sample of the injected bit pattern to determine if it is changing from "0" to "1" for alternate frames of the test channel.

The test pattern select device 203 also controls parity generator 158 by means of a control signal on line 160 which determines whether odd (normal) or even (error) parity is generated. The test pattern select device 203 is controlled by test pattern information stored in CPU interface 101 and provided to the test pattern select circuit on line 201. In response to a command from the CPU stored in CPU interface 101, the test pattern select circuit can insert a bit pattern intentional error into the bit pattern on outputs 150 by means of a signal on line 200. Furthermore, the test pattern select device 203 in response to test information stored in CPU interface 101 can also by means of output line 160 cause the parity generator 158 to produce an even parity bit (which results in an intentional parity error).

Once the test pattern, including the bit pattern (bits 0–8) and parity bit (bit 9), has been selected by test pattern select device 203, the bit pattern is generated in bit pattern generator 135 and made available at the outputs 150. The parity bit is generated at 164 in response to outputs 150 by a parity generator 158. The test pattern, available then on lines 150 and 164, is fed to the parallel-to-serial shift register 152 and multiplexed onto the output bus 50 in the same manner as previously described with reference to a busy channel which is processing an ordinary call.

After the idle channel test pattern has been inserted and multiplexed into the idle channel time slot on bus 50, the channel counter 120 increments to the next sequential channel to be processed. If the next sequential channel happens to be another idle channel, the idle channel mark signal on line 132 from memory 128 is blocked by idle channel flip-flop 171 which was previously set so that the next idle channel is not used as a test channel but is merely processed as an ordinary idle channel.

Having described the operation of the transmitter section 100 of card 47, attention will be focused on the receiver section 102 of the low level multiplexer/demultiplexer card 47. Again the operation of the receiver section 102 first will be described with respect to a busy channel which is processing an ordinary call. Ninety-six channels of serial data are received on input bus 50 from the high level multiplexer/demultiplexer 49. Bus 50 includes bus 351 which carries bits 0 through 7 of the data and bus 353 which carries bit 8 (the signaling bit) and bit 9 (the parity bit). The serial data on buses 351 and 353 is fed to serial-to-parallel shift register 304. Clock signals on line 119 drive shift register 304 which converts the serial data to ten bits of parallel information —data bits 0 through 7 on lines 308, the signaling bit (bit 8) on line 312 and the parity bit (bit 9) on line 314. Bits 0 through 7 on lines 308 and bit 8 (the signaling bit) on line 312 are fed to output drivers 316 and are transmitted via bus 46 to the digital-to-analog converters 45.

When an idle channel test is being run in the normal mode, the test pattern is inserted into an idle channel by transmit section 100, and a loop back connetion is set up in the switching network. As a result, that particular idle test channel is connected "in time" to the same low level multiplexer/demultiplexer channel card 47 and the same one of the 0 to 95 time channels selected by that card as a test channel. In order to identify the idle channel with its test pattern when it is received on bus 50 by receiver section 102, a constant delay shift register 318 is provided to delay the test channel signal on line 140 by 2,75 channel times and provide a delayed idle test channel signal on line 320. The fixed 2.75 channel time delay is provided to account for the time required to transmit the test pattern to the switching network from transmit section 100 and receive the test pattern back at the receiver section 102 of the multiplexer/demultiplexer circuit card 47.

The fixed delay only compensates for the transmission delay between the transmit section 100 and the receiver section 102 so that cross-connections between two circuit cards 47 cannot be accomplished during one frame time when the transmit section is using a higher numbered idle channel as a test channel than the receiver section. For example, if a first card 47 has selected channel 5 as an idle test channel and a second card 47 has selected channel 1 as an idle test channel, the cross-connection can be set up so that the first card 47 transmits the test pattern on channel 5 in one frame and the second card 47 receives the test pattern channel 1 in the subsequent frame. In that way the test pattern is received in the subsequent frame in synchronization with the delayed idle channel test signal on line 320 of the second card 47. The CPU is programmed simply to ignore the test results for the first or transition frame. The test channel signal on line 320 disables output drivers 316 so that none of the test channel data (bits 0–8) reach the digital-to-analog converters 45. Instead, the test pattern available on lines 308, 312 and 314 at the output of the serial-to-parallel shift register 304 is connected to test pattern check circuit 325. The test pattern check circuitry 325 tests the bit pattern for the all "0's" or all "1's" bit pattern which was inserted into the idle channel and checks for parity. If the bit pattern or parity bit are received with errors or discrepancies in relation to the injected pattern, that fact is signaled to the CPU interface 101 on line 345. The error information on line 345 is transmitted via address and data bus 112 back to the CPU so that the CPU can keep track of the occurrences of test pattern errors. Line 345 also provides the CPU with the ability to clear signals indicating test pattern errors so that it can keep a count of the total occurrences of such errors over a span of time, e.g., several frames.

With respect to idle test channel operation the test pattern check circuit 325 operates the same irrespective of whether the test pattern being inserted is a normal test pattern (an all "0's" bit pattern followed in the next frame by an all "1's" bit pattern) or whether a diagnostic pattern including BPIE or PPIE is inserted. The test pattern check 325 simply checks to determine whether the bit pattern is the all "0's" or all "1's" pattern and whether the parity bit is an odd parity bit. If the bit pattern is something other than all "0's" or all "1's" or the parity bit is even instead of odd, the test pattern check 325 indicates that an error has been found so that the CPU can determine of what significance that error is.

Turning to FIG. 4 which is a more detailed block diagram of the low level multiplexer/demultiplexer card 47, like numerals are used to identify like components in FIG. 3 and FIG. 4.

Turning first to the transmission section 100 of the low level multiplexer/demultiplexer card 47, the operation of the transmission section will be described in greater detail first with respect to a channel that is not being used as a test channel but is processing an ordinary call.

At some time after the call was set up by the processor control complex (CPU) 55, the processor informs the low level multiplexer/demultiplexer card of the address (channel) of the connection and the type of connection that was made (line-to-line, line-to-trunk, etc.). First the CPU transmits a connection code on address and data bus 112 to indicate the type of connection that is being made for the address just previously stored. The connection code is carried by the first three bits (0, 1, 2) of address data bus 112 which are stored in CPU connection code register 114 by a write data pulse on line 116 which is derived from CPU control inputs. CPU enable data (line 118) and CPU write (line 106).

At some later time CPU transmits the address of the connection via address and data bus 112 to CPU address register 104. The CPU then transmits a write signal on input line 106 and a CPU enable address signal on line 108. The CPU write signal (line 106) and the CPU enable address signal (line 108) together generate a write address pulse on line 110 which stores the connection address on CPU address and data bus 112 in the CPU address write register 104.

Circuit card channel address counter 120 counts the channels, 0 to 95, and indicates which channel is being processed during a particular frame of data. Counter 120 is synchronized by initializing reset signal on line 121. The counter is then clocked by a clock signal on line 117 having a 648 nanosecond period (one-half of the channel time—1.296 microseconds). The channel address count at the output 122 of the counter 120 is fed to comparator 124 where it is compared to bits 0–6 to the CPU address which is available at the output 105 of CPU address register 104. Because the channel count has only seven bits on line 122 and the CPU address register has eight bits on line 105 connected to the comparator 124, some provision must be made for bit 7 of the channel count. The comparators' bit 7 input 125 for the channel count is attached to a constant plus 5 voltage which produces a constant "1" input so that a valid comparison between the channel count and the CPU address occurs only when bit 7 of the CPU address is a "1". The requirement that bit 7 of the CPU address be a "1" is to indicate that the information on the CPU address and data bus is a valid channel address to be used in the comparator.

Once the comparator has determined that the card's channel address count is valid and equal to the CPU address word held in register 104, a write pulse is generated at the output 126 of the comparator 124. The write pulse on line 126 occurs at the midpoint of the channel time slot and is used to write the connection code held in register 114 into a random access connection code and idle channel mark memory (RAM) 128. The latter contains 96 words of storage addressable in sequence as the output of counter 120 signals channels 0–95. The connection code is stored in the random access memory at the address specified by the channel address counter 120.

Shortly after the writing into RAM 128, the connection code so stored therein is available during the last fourth of the channel time slot at output 130 (which is reality three lines, one for each bit, 0, 1 and 2, of the connection code) of the random access memory. That is, after the write signal at 126 disappears (the write signal also clears register 104), the RAM 128 is placed in a "Read" condition —so the contents of the address represented by signals on lines 122 are read out to lines 130, 132. The three bit code on line 130 is fed via three tristate drivers 134 (indicated for convenience by a single driver symbol) to read only memory (ROM) 136 in order to provide a page selection address to the ROM 136 the purpose of which will be set out below. The ROM 136 is part of the digital attenuator and bit pattern generator 135 (FIG. 3).

Data in 96 time signal channels, each channel being nine bits in parallel, is available to card 47 at inputs 46 which includes eight bits of PCM data (bits 0–7) and one signaling bit (bit 8). Bits 2 through 7 are connected directly to ROM 136 and bits 1, 8 and 0 care connected to two-to-one multiplexer 138. During processing of a busy channel, the selector input 140 to the multiplexer 138 selects the inputs 46 (bits 1, 8 and 0) and connects them respectively to multiplexer outputs 142, 144 and 146. As a result, the ROM has bits 1 through 7 connected to it to provide an address for the ROM.

Bits 1 through 7 are the digitally encoded value of the voice signal level. Bit 0 is the sign bit of the voice signal. The ROM serves as a digital attenuator which, based on the type of connection that has been made (line-to-line, line-to-trunk, etc.) and designated by connection code signals at lines 148, provides a predetermined attenuation of the voice signal level so that the voice level is constant at the terminal irrespective of the type of connection.

In order to accomplish the predetermined attenuation dictated by the type of connection that has been made, the seven bits (bits 1 through 7) of the voice signal in conjunction with the three bit paging code on line 148 provide a unique address to the ROM which has been preprogrammed to produce a unique 7 bit output from the ROM on output lines 150. The output of the ROM represents the new, attenuated, digitally encoded voice level.

Bits 1 through 7 on output lines 150 of the ROM are fed to parallel-to-serial shift register 152. Bits 0 (the sign bit) and 8 (the signaling bit) on multiplexer output lines 144 and 146 respectively are also connected to shift register 152. In addition a tenth bit, bit 9, which is a parity bit is connected to shift register 152 on line 164. The ten bits (0–9) at the input of shift register 152 are shifted out of the register 152 by a 162 nanosecond clock on line 153 and thus converted from parallel to serial format with bit 0 through 7 on line 51 and signaling bit 8 and parity bit 9 on line 53.

The parity bit on line 164 at the input to shift register 152 is generated by odd parity bit generator 158. The inputs to parity generator 158 include bits 1 through 7 on lines 150 from the ROM, bit 0 on line 146 from the multiplexer 138 and bit 8 on line 160 which is the output of exclusive OR gate 162. For normal operation line 168 is a "0" which allows bit 8 on line 144 to available at the output 160 of exclusive OR gate 162.

After the bits for one channel have been converted from parallel to serial and made available on output lines 51 and 53 in the 1.296 microseconds dedicated time slot that relates to that particular channel, the counter 120 is incremented by two 648 nanosecond clock pulses on line 117 (the least significant output bit, line 169, of the counter is not used to establish the count). After the channel address counter has been incremented, the next channel is processed by the attenuation circuit under control of the connection code held in the random access memory 128 and converted to serial format with a parity bit included.

Having described the operation of the transmitter section 100 of card 47 during normal operation when a call is being processed, the following description will focus on the situation in which an idle channel is being processed and used as part of an idle channel test.

The CPU complex 55 contains memories indicating the paired channels which have been connected by commands sent to the network connection memory; and it is these indications which permit the CPU to create the connection code signals mentioned above. When the CPU sees that any channel is not involved in a normal network connection, the "connection code" for that channel is signaled as a unique specific code. A "1" at the bit 3 location of the address and data bus 112 indicates that channel is "idle" and bits 0, 1, 2 select an idle channel attenuation output from the ROM 135. In such case, the connection code designates "no connection" for purposes of the attenuator 135 and marks the channel in question as being idle for purposes of selecting a test channel. It will be apparent that of the ninety-six channels treated on one card 47, several will probably be idle during any given period, and all of those will result in a corresponding idle channel marking code sent to lines 112 in association with their respective channel addresses. Each time this occurs, the bit 3 line of bus 112 will be a "1" when the idle marking code is present to indicate that a channel is idle.

That idle channel marking code for that address is then written into the CPU connection code register 114 and subsequently written into the random access memory 128 when the card address count indicated by counter 120 is equal to the address for the idle channel in the same manner as a connection code for a busy channel. All idle channels are thus marked, and the idle channel mark is stored in random access memory 128. When the idle channel code and connection information in the random access memory 128 are subsequently read out, the idle channel mark ("1") on line 132, which corresponds to bit 3 of the CPU data and indicates an idle channel, is connected to a NAND gate 174 which in conjunction with the $\overline{Q}$ output on line 176 of the idle channel flip-flop 170 (normally in a reset state) produces a test channel signal ("0") on line 178 and an inverted test channel signal ("1") on line 140. The "0" test channel signal on line 178 and the "1" test channel signal on line 140 indicate that the channel being processed by circuit card 47 is the idle channel which has been selected and is to be used as a test channel. Thus, the random access memory 128, the counter 120 and their associated circuitry provide an idle channel search means for selecting an idle channel for a test channel.

Subsequently at the halfway point of the idle channel's time slot a "0", corresponding to a half channel count, appears on first stage output line 169 of channel address counter 120. The least significant stage of counter 120 is not used to signal the "channel count state", and its output on line 169 thus toggles from 1 to 0 during each channel time. Line 169 is connected to gate 182 to produce a clock pulse on line 172 which sets idle channel flip-flop because the idle channel mark signal on line 132 is still a "1". The flip-flop 171 is thus employed as a bi-state storage unit which is set to store the detection of the first idle channel in any frame. When set, flip-flop 170 locks out the use of any subsequent idle channel in the frame as a test channel. With idle channel flip-flop 170 set, gates 174, 182 are disabled so that further pulses on line 169 cannot (during the frame in progress) produce a "0" at line 178 nor a "1" at line 140. The idle channel flip-flop 170 then stays set until a "clear" pulse arrives on line 173 at the beginning of the next frame of information when the channel address counter 120 has been reset to a count of zero. As a result, only the lowest numbered idle channel in each frame of 96 channels is used as a test channel. Once an idle channel (say, the 7th out of 96) has been selected as the test channel, it will so remain selected until conditions change, i.e., either a lower numbered channel becomes idle or the selected channel becomes busy with a call. Until conditions change, the signals at lines 178 and 140 will respectively be "1" and "0" only during the test channel (say, channel 7) time in every frame.

The idle channel mark ("1") on line 132 is also connected to NAND gate 184 which in conjunction with the $\overline{Q}$ output of idle channel flip-flop 170 and the half count pulse on line 169 produces a clock pulse on line 186 which stores the idle test channel address count on line 122 in a CPU feedback register 188. Because there are only seven bits of channel address (bits 0–6) available on line 122 and because the CPU address and data bus 112 will accommodate eight bits (0–7) of information, bit 7 into the feedback register 188 is connected to bit five (line 189) of the ROM output on lines 150 so that a sample of the test pattern being injected is written into the feedback register 188 in bit 7's location.

The idle test channel address and bit 5 from the ROM held in feedback register 188 are gated onto address and data bus 112 by means of an "enable read" signal on line 190 and a CPU enable address signal on line 108 which together produce a read signal on line 192. As a result, signals at bits 0-6 of bus 112 are sent back (written) into the CPU to indicate which channel is being used as an idle test channel. Bit seven of bus 112 tells the CPU whether bit five of the bit pattern being run in the idle channel is changing in a predetermined manner as will be more fully described below. Providing an indication of the status of bit five (or any other bit 1-7) from ROM 136 simply gives the control complex 55 a rough check from which to determine whether the output from the ROM 136 is working to produce the proper and expected test patterns.

Having thus selected the idle channel for the idle channel test, means for generating a test pattern for insertion in the idle channel may now be described. A "0" signal on line 178 and a "1" signal on line 140 indicate the channel then being treated is the test channel. The page selection code on line 148 (which is the output of tristate drivers 134) becomes all "1's" when the tristate drivers 134 are disabled by a resulting "0" level on line 195.

Furthermore, the "1" signal on line 140, indicating that the idle channel test is being conducted, is connected to the selector input of the two-to-one multiplexer 138. This causes the multiplexer to pass signals from inputs 196, 198 and 200 to outputs 142, 144 and 146, respectively.

A D-type, pattern flip-flop 202 which is part of test pattern select device 203 (FIG. 3) is normally in the set condition with a "1" on Q output 204 and a "0" on $\overline{Q}$ output 206. Q output 204 is connected through enabled NAND gate 208 to produce a "0" on input 200 of the multiplexer 138. The "0" on $\overline{Q}$ output 206 of flip-flop 202 is tied to inputs 196 and 198 of the multiplexer 138. As a result, the outputs 142, 144 and 146 of the multiplexer 138 are all "0's" during a first frame of the test channel. The flip-flop 202 forms a part of means to make the test bit pattern change complementally from all "0's" to all "1's" in alternate frames, as will now become apparent. This "exercises" the path to, through and from the network to test its ability to handle both 1's and 0's.

The "0" output on line 142 of multiplexer 138 in conjunction with the page selection code (all "1's") on line 148 selects a group of addresses in the ROM 136. Each stored word at those addresses has all "0's" stored in it and each generates an all "0's" output on lines 150. The ROM 136 is thus constructed so that for a particular combination of three "1's" on line 148 and a "0" on line 142 every combination of input bits 2-7 selects an address in the group which will output all "0's" data on lines 150.

After the idle channel test pattern has been inserted and transmitted, a locally generated pattern reset signal on line 199 occurs at the beginning of the next frame. The pattern reset signal resets the pattern flip-flop 202 so that during the next frame line 142 of multiplexer 138 will become a "1" which in combination with the three "1's" on page selector line 148, will select a group of addresses for which the outputs on line 150 will be all "1's". Again, the ROM 136 is constructed so that bits 2-7 select an address location within the group selected by the page selection code of all "1's" on line 148 and a "1" on line 142. During the selected test channel time of alternate frames, therefore, the signals on lines 150 are all "0's" and all "1's".

Having generated the bit pattern for insertion in the idle channel by means of the ROM 136 and the pattern flip-flop 202, a parity bit is next generated. Focusing on the all "0's" bit pattern for example, the parity bit is generated by parity generator 158 in the following manner. The output on line 144 (a "0") of the multiplexer 138 is fed directly through exclusive OR gate 162 to the parity generator 158. Also, output line 146 (a "0") of the multiplexer 138 is fed to the parity generator. These two signals form input bits 8 and 0 for the parity generator. Furthermore, bit pattern bits 1-7 (all "0's") on output lines 150 of the ROM 136 are fed to the parity generator 158. The parity generator 158 in response to the all "0" inputs generates an odd parity bit on line 164 in the conventional manner. The odd parity bit becomes bit 9 and is connected to the parallel to serial shift register 152.

In addition to the parity bit, bit pattern bits $1 \propto 7$ on lines 150 are also connected to the parallel to serial shift register 152 as well as bit pattern bit 0 on line 146 (a "0") and bit pattern bit 8 on line 144 (a "0"). The bit pattern bits (all "0's") and the parity bit in the parallel to serial shift register 152 are then shifted out in the same manner in which ordinary call information is serialized and sent to the high level multiplexer/demultiplexer 49 on lines 51 (bits 0-7) and 53 (bits 8 and 9).

During the test channel time one frame later, after an all "0's" bit pattern and a parity bit have been inserted into the test channel, the pattern flip-flop 202 has been reset, and the bit pattern becomes all "1's" for the idle channel test with an odd parity bit for the subsequent frame. As noted before, bit 5 of the output of the ROM 136 is fed to the CPU feedback register 188 where it is held and then read by the CPU which determines that at least one bit of the eight bit test pattern in the "test" channel has toggled between the two frames.

In order to provide additional fault detection and diagnostic capabilities to be more fully described, the transmit section 100 of the low level multiplexer/demultiplexer card 47 can insert either a BPIE or a PPIE in the test pattern being transmitted to the high level multiplexer/demultiplexer 49. When this is to be done, the idle channel to be used for the idle channel test is again selected in the manner previously described by means of the idle channel mark signal stored in and read from the RAM 128 to set flip-flop 170 and associated gates 174 and 184. In addition to the idle channel mark (a "1" on bit 3 of the CPU address and data bus 112 when control lines 106 and 118 are simultaneously high), the CPU creates in the code on address and data bus 112 a command that a BPIE or a PPIE ought to be included in the test pattern.

To initiate a BPIE, the CPU makes bit 4 address and data bus 112 reside at a "1". A write data signal on line 116 passes NAND gate 210 (assuming tristate gate 216 to be disabled) to set bit pattern intentional error flip-flop 212 which is a set-reset flip-flop. The resulting "1" level on Q output line 214 is inverted and disables gate 208, thereby producing a "1" on input line 200 of multiplexer 138. As a result, when the pattern flip-flop 202 is set (to call for an all "0's" bit pattern), input 200 to the multiplexer 138 is a "1", and output 146 is also a "1" during the test channel time. As a result, the bit pattern instead of being all "0's" has a "1" in the bit 0 location at the output of shift register 152, and a bit pattern with an intentional error is thus generated.

When an all "1's" pattern is generated in the next frame after resetting of pattern flip-flop 202, the "1" on line 214 of pattern error inject flip-flop 212, calling for a BPIE, has no effect on gate 208 when its other input (the $\overline{Q}$ output 206 of pattern flip-flop 202) is also a "0". Therefore, the all "1's" bit pattern is unchanged and no bit pattern intentional error is created in the all "1's" test pattern.

Tristate gate 216 is fed by the Q output of the flip-flop 212 so that in the presence of a read data command on line 218, the tristate gate can supply a "1" signal to bit 4 of the CPU address and data bus 112. When received back at the CPU, this indicates that the bit pattern error inject flip-flop is set and that such an error should be subsequently discovered by the bit pattern test circuitry which will be described below.

The bit pattern error inject flip-flop 212 can be cleared to eliminate the injection of BPIE's by causing the CPU to transmit a "1" on bit 5 from the CPU address and data bus 112 in conjunction with a write data signal (a "1") on line 116 which together enable gate 213 to clear the bit pattern error inject flip-flop 212. Again, the state of the bit pattern error inject flip-flop 212 can thereafter be read on bit 4 of the CPU address and data bus 112, and sent back to the CPU, by a read data signal on line 218 to the tristate driver 216.

A parity intentional error (even parity in the illustrative embodiment) is generated by means of parity intentional error (PIE) flip-flop 220 which is a D-type flip-flop. By transmitting a "1" on bit 6 of the CPU address and data bus 112 which is connected to the data input of flip-flop 220 and transmitting a write data signal on line 116 which is the clock input of flip-flop 220, the CPU can set PIE flip-flop 220. The resulting "0" signal on $\overline{Q}$ output 222 enables NOR gate 224 so that the "0" on line 178 from the idle channel flip-flop 170 can produce a "1" on input line 168 to the exclusive OR gate 162. This causes the output 160 to be the complement of the input 144. By feeding the complement of bit 8 of the bit pattern to the parity generator 158, the odd parity is transformd to even parity, and an intentional parity error is injected into the test channel.

In order for the CPU to keep track of the existence of a parity error, a tristate gate 228 is connected to the Q output 223 of PIE flip-flop 220 and is activated by a read data pulse on line 218. The enabled tristate gate 228 causes bit 6 of the CPU address and data bus 112 to become a "1", thereby informing the CPU that an intentional parity error is being injected into the test channel. The PIE flip-flop 220 is cleared when the CPU next produces a "0" signal on bit 6 line of data bus 112 simultaneously with a clock pulse on line 116 (control lines 106 and 118 both high).

Having described the transmission section of the low level multiplexer/demultiplexer card 47 and how it selects an idle channel, injects a test pattern, and provides for intentional bit pattern error and/or parity errors, attention will now be focused on the receiver section 102 which is part of every low level multiplexer/demultiplexer card 47.

Considering first the normal operation of the receiver section when an ordinary call is being processed by a busy channel, the 96 channels of serial data are received back from the network and second order demultiplexer on input lines 351 (bits 0 through 7) and 353 (bits 8 and 9). Serial to parallel shift register 304 converts the serial data on line 351 to eight bits of parallel data by means of 162 nanosecond clock pulses (channel time, 1.296 microseconds, divided by 8 bits) on line 306. The 162 nanosecond clock has been delayed so that it begins pulsing 2.75 channel times after the transmit section begins processing channel 0. In that manner the clock begins operating in synchronization with the receipt of channel 0 by the receiver section. The shift register 304 produces an eight bit parallel output on lines 308. A 324 nanosecond clock signal on line 310 (also delayed by 2.75 channel times) converts the signaling bit (bit 8) and the parity bit (bit 9) on line 353 to two parallel bits on lines 312 and 314, respectively. Bits 0-7 on lines 308 and bit 8 on line 312 are connected directly to output drivers shown collectively at 316 for transmission to a digital-to-analog converter 45 via bus 46.

Turning now to the detection of faults which show up as discrepancies in received test bit patterns, relative to those injected, the receiver section 102 includes received test pattern checking means which comprises a bit pattern comparator 322 and parity tester 336. The test channel into which the test pattern is being injected is identified in time, as previusly described, by means of the RAM 128, the flip-flop 170, and the associated gates 174 and 184 which make lines 140 and 178 respectively carry "1" and "0" signals during the test channel transmit times. The "1" on line 140 is fed to shift register 318 which shifts the signal in time (approximately 16 channel times) to provide a delayed test channel signal on output line 320. The time delay assures that the test pattern data transmitted by the transmitter section 100 to the high level multiplexer/demultiplexer 49, to the switching network 52 and back reaches the inputs 351 and 353 of the receiver section 102 and is processed in phase with the delayed test channel signal on line 320.

In that regard it should be recalled that in normal operation, the connection set up by the control complex or CPU 55 in the switching network causes the test pattern to be looped back to the same low level multiplexer/demultiplexer card 47. Cross-connections between cards 47 can be made by the switching network. Because the 2.75 channel time delay of shift register 318 only provides for the actual transmission delay to and from the network, there may be a transition frame where the test pattern is transmitted in a particular channel on a first card 47 and received in a lower numbered channel on a second card 47. By the time the switching network has received the higher numbered channel from the first card, the lower numbered channel on the second card has already been received and processed during the transition frame. As a result, only during the subsequent frame does the second card receive a valid test pattern in synchronization with the idle test channel of the second card. The purpose of providing cross-connections will be more fully set out.

When an idle test channel is being received on inputs 351 and 353 as indicated by the signal on line 320, the serial data is converted to parallel data by shift register 304 in the same manner as ordinary data and made available on output lines 308, 312 and 314. The bit pattern bits 0-8 are fed to a dynamic bit pattern comparator 322 which is enabled by the delayed test channel signal on line 320 and which compares adjacent bits in order to determine if the bit pattern is all "1's" or all "0's". When the comparator finds that any one of the adjacent bits 0-8 is different, the comparator produces a bit pattern error signal (a "1") on output line 324 which is retained in a storage means here shown as a flip-flop 326. More particularly, the line is connected to the data input of a D-type, bit pattern error (BPE) flip-flop 328.

The BPE flip-flop 326 is normally reset so that the Q output on line 330 is a "0" which enables NOR clock gate 328 and allows the 162 nanosecond clock pulse on line 306 to clock the bit pattern error signal into BPE flip-flop 326. Once the bit pattern error signal on line 324 has thus set the flip-flop 326, the "1" output on line 330 disables clock gate 328. The bit pattern error signal (line 330) is sent back to the CPU by means of a tristate gate 332 which is activated by a read data signal on line 218. The output of tristate gate 332 on line 334 is connected to CPU address and data bus bit 5, and a "1" level indicates to the CPU that bit pattern error has been found.

With regard to parity checking, a parity tester 336 has as its inputs all ten bits of data coming from the serial to parallel shift register 304. The parity tester tests for parity in the conventional manner. If a parity error is found, a "1" is put on output line 338. Delayed test channel signal on line 320 enables a gate 340, and the parity error signal on line 338 produces a parity error signal (a "1") on line 342 which is retained in a storage means here embodied as a flip-flop 344. The parity error signal at 338 is fed to the D input of a parity error (PE) flip-flop 344.

The PE flip-flop is normally reset so that the $\overline{Q}$ output (a "1") on line 347 enables a NOR gate 346 to allow a 1.296 microsecond clock pulse on line 349 (delayed by approximately 2.75 channel times) to set flip-flop 344 if line 342 is high. The Q output of the PE flip-flop 344 on line 348 is the parity error signal (a "1") and is fed to a tristate gate 350, which when enabled by a read data signal on line 218, transmits the state of the parity error flip-flop 344 to the CPU on bit 7 of the CPU address and data bus 112.

After the central processor has read the states of the BPE flip-flop 326 and the PE flip-flop 344, those storage flip-flops are cleared by a "1" sent from the CPU on bit 7 of the data bus 112 simultaneously with a write data signal on line 116. This activates NAND gate 352 to clear the flip-flops. The CPU will scan and clear flip-flops 326 and 344 at fixed intervals during normal testing and count the number of errors that are observed. As a result, the processor is able to determine whether or not a detected error is merely a transient situation or whether it is chronic and further diagnosis need be made.

The fault detection and diagnostic functions provided by each circuit card 47 can be used to detect and isolate faults in the switching system's information path including the low level and high level multiplexers/demultiplexers 48 and 49 and the switching network. The following is one example in which the inventive concepts previously described in connection with FIG. 3 and FIG. 4 may be used to provide switching system maintenance.

In the first instance during real time the idle channel test is run in the normal mode with a loop back connection and a normal test pattern (no BPIE or PPIE). The lowest idle channel served by each circuit card 47 is selected as a test channel, identified via the feedback register 188 in the CPU, and the latter sends commands to the network connection memory to establish the loop back connections.

Periodically in order to assure that control the fault detection circuitry (including bit pattern comparator 322, bit pattern error flip-flop 326, parity tester 336 and parity error flip-flop 344) is working the CPU initiates self testing. Self testing is initiated by the control complex setting data bit 4 to a "1" while creating a write data signal on line 116 to set flip-flop 212 so as to inject a BPIE. After the test pattern with the BPIE has been transmitted and received, the processor receives the state of the BPE flip-flop 326 to determine if the intentional error was discovered by the fault detection circuitry.

Next, the control complex by setting bit 6 of bus 112 to "1" (simultaneously with 1's on control lines 106, 118) can set PPIE flip-flop 220 to cause injection of a PPIE into the test pattern. Subsequently the CPU senses the PE flip-flop 344 to determine if the intentional parity error was discovered. After the control complex 55 has tested the fault detection circuitry, the idle channel test continues in the loop back mode waiting for an error to crop up. The control complex 55 scans the BPE flip-flop 326 and the PE flip-flop 344 at a fixed interval for a predetermined number of cycles and counts the number of errors that are observed. Once the processor control complex 55 has determined that an excessive number of bit pattern errors or parity errors are appearing, the processor can take action to diagnose the cause of those errors.

In order to diagnose the cause of a persistent error, the control complex sets up a series of systematic cross-connections among cards 47 (FIG. 2) to isolate the faulty component. For example, by systematically cross-connecting all cards 47 together, two channels at a time, in the switching network on command from the control complex 55, a faulty transmitter section can be isolated on a particular card 47. That is, if channel 6 (out of 96) on card 47a is selected as the test channel there, and channel 8 (out of 96) is selected as the test channel on a second card 47b, those two channels might be designated as channels 6 and 104 in terms of the network time slots and any error that is common to a particular time slot thus isolates the components unique to that card 47 and that time slot in the switching network.

One skilled in the art can readily appreciate and provide the necessary computer control in the CPU complex 55 to implement the systematic cross-connections in order to fully utilize the capabilities of the inventive concepts described.

Finally, for completeness, FIGS. 5a, 5b and 6 disclose in detail a preferred and exemplary commercial embodiment of the inventive concepts illustrated in the block diagrams of FIGS. 3 and 4 and described above. FIGS. 5a, 5b and 6 are one means of implementing the principles and inventive concepts previously described in connection with FIGS. 3 and 4. The reference numerals of FIGS. 3 and 4 are used where appropriate to designate similar devices in the schematics of FIGS. 5a, 5b and 6, so that the latter will be fully understandable to one skilled in the art without further word description. To aid in such understanding the following table provides standard references for those integrated circuits of FIGS. 5a, 5b and 6 whose organizations and functions may not be immediately apparent from the logical symbol itself. Furthermore, standard notation has been used to denote inputs and outputs where necessary:

| Description | Ref. Numeral | Standard Integrated Circuit |
|---|---|---|
| Connection code RAM | 128 | 2101A-2, random access memory, 256 × 4 bit |
| ATT. and test | 136 | 93438, read only memory |

-continued

| Description | Ref. Numeral | Standard Integrated Circuit |
|---|---|---|
| pattern ROM | | 512 × 8 bit Fairchild Semiconductor Mountain View, California |
| 2 to 1 MUX | 138 | SN74LS157, 2 to 1 multiplexer Texas Instruments Dallas, Texas |
| Pattern flip-flop | 202 | SN74S74, D-type flip-flop Texas Instruments Dallas, Texas |
| Parity generator | 158 | SN74LS280, 9 bit parity generator Texas Instruments Dallas, Texas |
| Parallel to serial shift register | 152 | SN74LS195A, 4 bit parallel shift register Texas Instruments Dallas, Texas |
| Idle channel flip-flop | 170 | SN74LS74, D-type flip-flop Texas Instruments Dallas, Texas |
| CPU conn. code register | 114 | SN74LS175, D-type, flip-flop Texas, Instruments Dallas, Texas |
| CPU address register | 104 | SN74LS273, D-type flip-flop Texas Instruments Dallas, Texas |
| CPU feedback register | 188 | SN74LS374, D-type flip-flip Texas Instruments Dallas, Texas |
| Channel counter | 120 | SN74LS163, 4 bit counter Texas Instruments Dallas, Texas |
| Comparator | 124 | SN74LS85, 4-bit comparator and SN74LS279, set-reset flip-flop Texas Instruments Dallas, Texas |
| BPIE flip-flop | 212 | SN74LS279, set-reset flip-flop Texas Instruments Dallas, Texas |
| PPIE flip-flop | 220 | SN74LS74, D-type flip-flop Texas Instruments Dallas, Texas |
| Shift register (delay) | 318 | SN74LS164, 8-bit shift register Texas Instruments Dallas, Texas |
| Serial to parallel shift register | 304 | SN74LS164, 8-bit shift register and SN74LS195A, 4-bit parallel shift register Texas Instruments Dallas, Texas |
| Parity tester | 336 | SN74LS280, 9-bit parity checker Texas Instruments Dallas, Texas |
| Bit pattern error flip-flop | 326 | SN74S74, D-type flip-flop Texas Instruments Dallas, Texas |
| Parity error flip-flop | 344 | SN74S74, D-type flip-flop Texas Instruments Dallas, Texas |

We claim:

1. In a digital time division multiplex telecommunications switching system having multiplex/demultiplex means for routing digital information samples, in dedicated time division channels, grouped in frames, to and from assigned locations in an information memory of a switching network, the switching system also having a control complex for controlling the switching network to establish time division connections in the switching network and for monitoring the connections in order to mark idle channels with a predetermined marking code, a fault detector for determining the existence of a fault condition in the switching system's information path including the multiplex/demultiplex means and the switching network comprising (a) idle channel search means responsive to the predetermined marking code for selecting an idle channel in the multiplex/demultiplex means for use as a test channel;
(b) test pattern generation means for injecting a predetermined test pattern into the selected idle channel; and
(c) test pattern checking means for receiving the test pattern from the selected idle channel after the test pattern has been routed through the multiplex/demultiplex means to and from the switching network and for determining whether the test pattern which was injected in the idle channel was accurately received from the idle channel.

2. The fault detector of claim 1 wherein the idle channel search means includes counter means to provide a unique count for each channel within each frame to designate the channel being treated by the multiplex/demultiplex means, and an addressable memory for receiving and holding the idle channel marking code until the counter means addresses the memory and reads out the marking code.

3. The fault detector of claim 2 wherein the idle channel search means includes an idle channel bi-state storage unit which is set when an idle channel in a frame is detected for use as a test channel to assure that only one idle channel per frame is used as a test channel, together with means for resetting said unit at the end of a frame.

4. The fault detector of claim 1, wherein the test pattern checking means includes error storage means, responsive to a discrepancy in the test pattern returned from the network for informing the control complex of the presence of a fault condition.

5. The fault detector of claim 1, wherein the test pattern generation means includes test pattern error insert means for inserting an intentional error into the test pattern in order to assure that the test pattern checking means is functioning properly.

6. The fault detector of claim 1, wherein the test pattern generation means includes bit pattern generation means and parity bit generation means for generating both a bit pattern and a parity bit for injection into the test channel as the test pattern.

7. The fault detector of claim 6 wherein the test pattern checking means includes bit pattern checking means and parity bit checking means to determine that the bit pattern and the parity bit received from the idle channel were accurately transmitted through the multiplex/demultiplex means and the switching network.

8. The fault detector of claim 7 wherein bit pattern error insert means are provided for inserting a bit pattern intentional error into the test channel in order to assure that the bit pattern checking means is functioning properly.

9. The fault detector of claim 7 wherein parity bit error insert means are provided for inserting a parity bit intentional error into the test channel in order to assure that the parity bit checking means is functioning properly.

10. The fault detector of claim 7, wherein the test pattern checking means includes error storage means, responsive to an error in the received bit pattern and the parity bit for informing the control complex of the presence of a fault condition.

11. The fault detector of claim 1, wherein the test pattern generation means includes a read only memory preprogrammed so that in response to the idle channel marking code, the test pattern is read out.

12. The fault detector of claim 1, wherein the test pattern generation means includes test pattern toggling means for generating a complementary bit pattern for injection into the idle test channel during alternate frames.

13. In a digital time division multiplex telecommunications switching system having multiplex/demultiplex means for routing digital information samples, in dedicated time division channels, grouped in frames, to and from assigned locations in an information memory of a switching network, the improvement for detecting and isolating faults in the multiplex/demultiplx means and the switching network comprising:
 (a) a control complex for controlling the switching network to establish time division connections in the switching network and for monitoring the connections in order to mark idle channels with a predetermined marking code; and
 (b) a plurality of fault detectors each comprising:
  (i) idle channel search means responsive to the predetermined marking code for selecting an idle channel in the multiplex/demultiplex means associated with that fault detector for use as a test channel;
  (ii) test pattern generation means for injecting a predetermined test pattern into the selected idle channel; and
  (iii) test pattern checking means for receiving the test pattern from the test channel after the test pattern has been routed through the multiplex/demultiplex means to and from the switching network and for determining whether the test pattern which was injected into the test channel was accurately received from the idle channel, wherein the control complex is adapted to cause the fault detector to send predetermined bit patterns through different ones of a plurality of paths through the multiplex/demultiplex means to test those paths.

14. The improvement of claim 13 wherein the idle channel search means includes counter means to provide a unique count for each channel within each frame and for designating the channel being actively used by the multiplex/demultiplex means, and an addressable memory for receiving and holding the idle channel marking code until the counter means addresses the memory and reads out the marking code.

15. The improvement of claim 14 wherein the idle channel search means includes an idle channel storage unit which is set when the first idle channel in a frame is detected for use as a test channel to assure that only one idle channel per frame is used as a test channel and to provide a test channel timing signal to identify the test channel, together with means for resetting said unit at the end of a frame.

16. The improvement of claim 15, wherein the test pattern checking means includes delay means for delaying the test channel timing signal so that the checking means operates in phase with the later reception of the injected test pattern from the switching network.

17. The improvement of claim 13, wherein the test pattern checking means includes error storage means, responsive to a discrepancy in the test pattern signals returned from the network for informing the control complex of the presence of a fault condition.

18. The improvement of claim 13, wherein test pattern generation means include means for inserting an intentional error into the injected test pattern in order to assure that the test pattern checking means is functioning properly.

19. The improvement of claim 13, wherein the test pattern generation means includes bit pattern generation means and parity generation means for generating both a bit pattern and a parity bit for injection as a word into the selected idle channel as the test pattern.

20. The improvement of claim 19 wherein the test pattern checking means includes a bit pattern checking means and parity bit checking means to determine that the bit pattern and the parity bit received in the idle channel were accurately transmitted through the multiplex/demultiplex means and the switching network.

21. The improvement of claim 20 wherein said test pattern generation means includes means for inserting an intentional bit pattern error into the test channel in order to assure that the bit pattern checking means is functioning properly.

22. The improvement of claim 20, wherein said test pattern generation means includes means for inserting an intentional parity bit error into the test channel in order to assure that the parity bit checking means is functioning properly.

23. The improvement of claim 20, wherein the test pattern checking means includes error storage means, responsive to an error in the received bit pattern and the parity bit for informing the control complex of the presence of a fault condition.

24. The fault detector of claim 13, wherein the test pattern generation means includes a read only memory preprogrammed so that in response to the idle channel marking code, the test pattern is read out.

25. The fault detector of claim 13, wherein the test pattern generation means includes test pattern toggling means for generating a complementary bit pattern for injection into the idle test channel during alternate frames.

26. In a digital time division multiplex telecommunications switching system having multiplex/demultiplex means for routing digital information samples, in dedicated time division channels, grouped in frames, to and from assigned locations in an information memory of a switching network where time division connections are established, a method for determining the existence of a fault condition in the multiplex/demultiplex means and the switching network comprising the steps of:
 (a) marking an idle channel with a predetermined marking code;
 (b) selecting an idle channel for use as a test channel by locating the predetermined marking code;
 (c) inserting a test pattern into the test channel at a point in the multiplex/demultiplex means and routing the test pattern to the switching network;
 (d) connecting the test channel in loop back fashion through the switching network back to the multiplex/demultiplex means; and
 (e) checking the test pattern upon its return through the multiplex/demultiplex means to determine whether the test pattern which was injected into the test channel at the point in the multiplex/demultiplex means is received without discrepancy in the test channel in the multiplex/demultiplex means.

27. The method of claim 26 wherein selecting the idle channel for a test channel further includes the steps of providing a unique channel count signal for each channel within each frame, using that count signal to designate the channel being treated by the multiplex/demultiplex means, receiving and holding an idle channel marking code which arrives in association with a given channel, and reproducing the marking code during the same channel time of subsequent frames in response to the same count signal for selecting an idle channel as a test channel.

28. The method of claim 27 wherein the selecting of the idle channel further includes the step of setting a bi-stable unit for assuring that the first idle channel selected for use as a test channel is the only channel per frame that is used as a test channel, and resetting said unit at the end of each frame.

29. The method of claim 26 wherein the step of verifying the test pattern further includes recording errors in the test pattern as they appear in successive frames and counting the number of errors to determine the presence of a fault condition.

30. The method of claim 26 wherein the step of inserting a test pattern includes inserting a bit pattern and a parity bit into the test channel as a multi-bit word.

31. The method of claim 30 wherein the step of checking the test pattern includes checking to confirm that both the bit pattern and the parity bit were accurately transmitted through the switching network.

32. The method of claim 30 wherein the step of inserting a bit pattern includes inserting a bit pattern intentional error into the idle channel and verifying that a bit pattern error is detected to assure that the step of checking the bit pattern is being properly performed.

33. The method of claim 30 wherein the step of inserting the parity bit includes inserting a parity bit intentional error and verifying that a parity bit error is detected to determine that the step of checking the parity bit is being properly performed.

34. The method of claim 30 wherein the step of checking the test pattern includes recording errors detected in the bit pattern and the parity bit during each of successive frames, and counting the number of recorded errors to determine the presence of a fault condition.

35. The method of claim 30 wherein the step of inserting a test pattern includes generating a complementary bit pattern for injection into the test channel in alternate frames.

36. The method of claim 35 further including sensing at least one bit of the test pattern in every frame to confirm that alternate frames have complementary test bit patterns.

37. In a digital time division multiplex telecommunications switching system having multiplex/demultiplex means for routing digital information samples, in dedicated time division channels, grouped in frames, to and from assigned locations in an information memory of a switching network where time division connections are established, a method for determining the existence of a fault condition in the multiplex/demultiplex means and the switching network and isolating that fault comprising the steps of:

(a) producing an idle mark status signal associated with identifying addresses of those channels which are not involved in connections established in the network;

(b) selecting an idle channel for use as a test channel by detecting an idle mark signal;

(c) inserting a test pattern into the test channel at an input point in the multiplex/demultiplex means and routing the test pattern to the switching network;

(d) connecting the test channel through the switching network to an output point in the multiplex/demultiplex means; and (e) checking the test pattern upon receipt of the test pattern from the switching network through the mltiplex/demultiplex means to determine whether the test pattern which was injected into the test channel at the input point in the multiplex/demultiplex means is accurately received in the test channel at the output point in the multiplex/demultiplex means.

38. The method of claim 37 wherein selecting the idle channel for a test channel further includes the steps of providing a unique channel count signal during each channel time within each frame, using that count to designate the channel being treated by the multiplex/demultiplex means, and receiving and holding the idle status signal until it is recovered in response to the channel count corresponding to the address associated therewith.

39. The method of claim 38 wherein the selecting of the idle channel further includes the step of setting a bi-state storage unit after a recovered idle status signal has been used for assuring that the first idle channel selected for use as a test channel is the only channel per frame that is used as a test channel, recovering a test channel timing signal when the bi-state unit is in the reset state and a recovered idle status signal is present to identify the test channel, and resetting said bi-state unit at the end of a frame.

40. The method of claim 39 wherein the step of checking the test pattern includes delaying the test channel timing signal so that verifying of the received test pattern occurs in phase with the reception of the test pattern from the switching network.

41. The method of claim 37 wherein the step of checking the test pattern further includes recording any error in the received test pattern during each frame, and counting the number of errors to determine the presence of a fault condition which is not merely transient.

42. The method of claim 37 wherein th step of inserting a test pattern includes inserting both a bit pattern and a parity bit into the test channel as a multi-bit word.

43. The method of claim 42 wherein the step of checking the test pattern includes verifying that the bit pattern and the parity bit were accurately transmitted through and received back from the switching network.

44. The method of claim 42 wherein the step of inserting a bit pattern includes inserting a bit pattern intentional error into the test channel to assure that the step of checking the bit pattern is being properly performed.

45. The method of claim 42 wherein the step of inserting the parity bit includes inserting a parity bit intentional error for determining that the step of checking the parity bit is being properly performed.

46. The method of claim 42 wherein the step of checking the test pattern includes recording any error in the bit pattern and the parity bit during each frame, and counting the number of errors to determine the presence of a fault condition which is not merely transient.

47. The method of claim 37 wherein the connection established through the network is a loop-back connection, and the input point and the output point are such that the test pattern is received back from the network in the same receive time channel as the transmit time channel in which it was sent.

48. The method of claim 37 wherein the connection established through the network is a cross-connection, and the input point and the output point are such that the test pattern is received back from the network in a network sending time channel which differs from network receiving time channel in which the test pattern was sent.

49. The method of claim 48 wherein the cross-connections are repeatedly changed so that different paths through the multiplex/demultiplex means and the network are successively tested.

* * * * *